(12) United States Patent
Sato et al.

(10) Patent No.: US 7,006,260 B2
(45) Date of Patent: Feb. 28, 2006

(54) IMAGE SENSING APPARATUS, INFORMATION PROCESSING APPARATUS, AND METHOD OF CONTROLLING IMAGE SENSING APPARATUS

(75) Inventors: Yuichi Sato, Kanagawa (JP); Nobukazu Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 928 days.

(21) Appl. No.: 09/993,017

(22) Filed: Nov. 5, 2001

(65) Prior Publication Data

US 2002/0075529 A1 Jun. 20, 2002

(30) Foreign Application Priority Data

Nov. 7, 2000 (JP) .............................. 2000-339353
Oct. 22, 2001 (JP) .............................. 2001-323519

(51) Int. Cl.
*H04N 1/04* (2006.01)
*H04N 1/40* (2006.01)

(52) U.S. Cl. ...................... 358/448; 358/462; 358/486; 358/474

(58) Field of Classification Search ................ 358/448, 358/462, 486, 474
See application file for complete search history.

(56) References Cited

U.S. PATENT DOCUMENTS

| 5,170,266 A | 12/1992 | Marsh et al. ................ 358/468 |
| 5,760,727 A | 6/1998 | Lin ............................. 341/155 |
| 5,943,139 A | 8/1999 | Tang et al. .................. 358/412 |

*Primary Examiner*—Edward Coles
*Assistant Examiner*—Houshang Safaipour
(74) *Attorney, Agent, or Firm*—Morgan & Finnegan, LLP

(57) ABSTRACT

In an image sensing system comprising a host computer and an image sensing apparatus, the image sensing apparatus includes a contact sensor for sensing an object and outputting an image signal representing the image of the object, and an image processing circuit for subjecting the image signal to predetermined signal processing. The host computer and the image sensing apparatus communicate via an interface. Whether processing is executed by the image processing circuit within the image sensing apparatus is changed over in accordance with the communication speed of the interface.

47 Claims, 25 Drawing Sheets

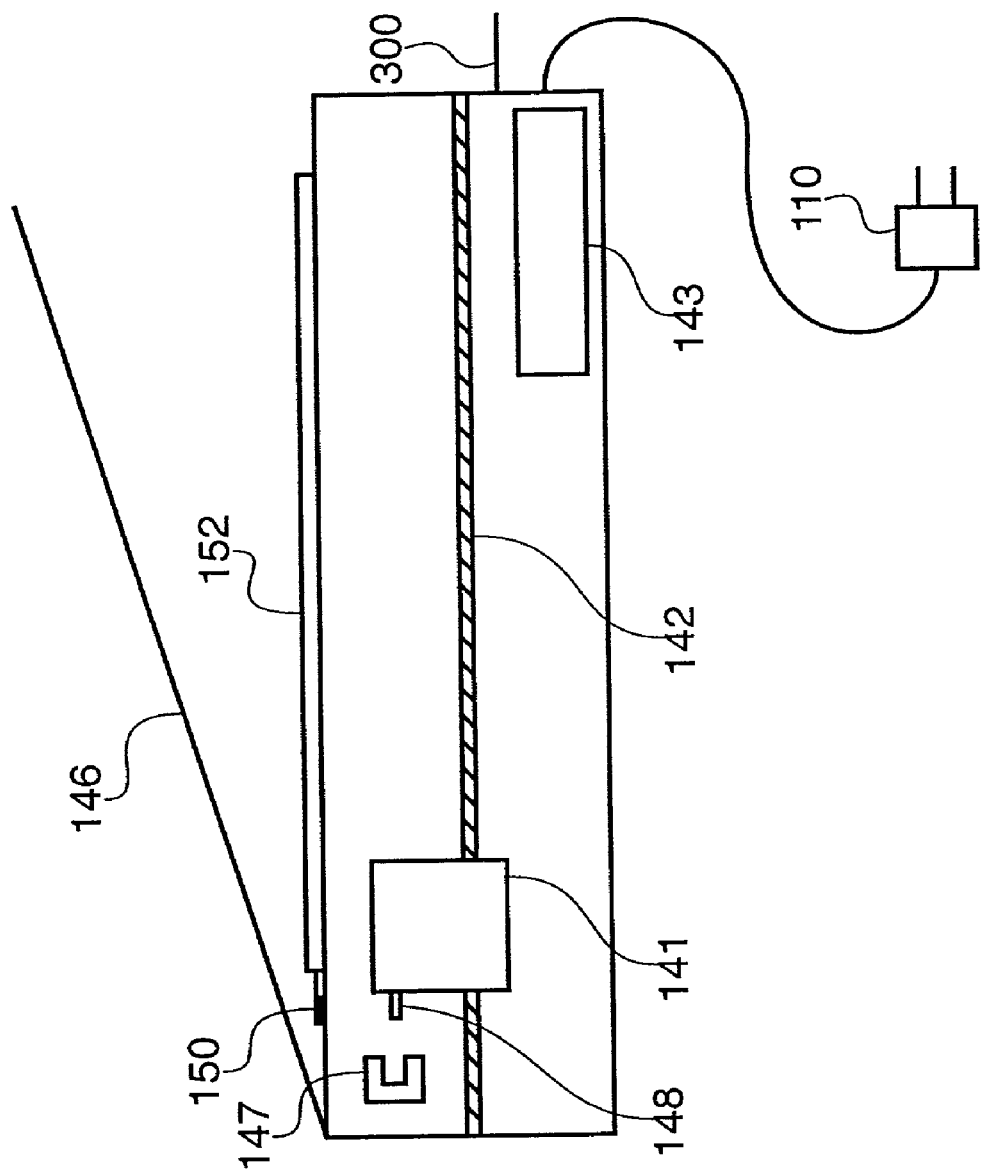

IMAGE SENSING APPARATUS, INFORMATION PROCESSING APPARATUS, AND METHOD OF CONTROLLING IMAGE SENSING APPARATUS

FIELD OF THE INVENTION

The present invention relates to an image sensing apparatus for inputting an image to a personal computer, an information processing apparatus and a method of controlling the image sensing apparatus. More particularly, the present invention relates to an image sensing apparatus in an image sensing system that uses an interface the communication speed of which can be changed over, capable of optimally controlling a variety of processing within the image sensing apparatus in accordance with each communication speed, and to an information processing apparatus and a method of controlling the image sensing apparatus.

BACKGROUND OF THE INVENTION

A facsimile machine that selects the optimum transmission speed in conformity with the transmission quality of a communication line has been proposed, as disclosed in the specification of Japanese Patent Application Laid-Open No. 5-252370.

Also available is an image scanner that uses an interface compliant with RS 232C, IEEE 1284 (parallel), SCSI or USB 1.1, or a special-purpose interface, in order to be connected to a personal computer.

A bottleneck encountered in terms of image reading speed in these conventional image sensing apparatus is the speed of the interface. In an image sensing apparatus that uses an interface having a comparatively low speed, however, high-quality, efficient transmission is carried out by converting image data to eight bits and transmitting the 8-bit data after image processing such as a shading correction, gamma correction and resolution conversion is executed by hardware.

High-speed serial interfaces such as those compliant with USB 2.0 and IEEE 1394 have been standardized in recent years, thereby making possible an environment in which high-speed transmission can be achieved.

Further, proposal for widening a variable magnification range by changing speed reduction ratio using an electromagnetic switch in accordance with a scanning resolution is disclosed in Japanese Patent Application Laid-Open No. 5-300333.

Furthermore, an apparatus that improves driving efficiency by transmitting driving power of driving means to operation means by using different transmission gear ratios for forward scan and backward scan changed by a single direction clutch as well as reduces generation of vibration at the time of image scanning is suggested in Japanese Patent Application Laid-Open No. 2000-013574.

Further, as an image reading apparatus connected to an external apparatus such as a computer or the like when it is used, an image reading apparatus, which operates using electric power supplied from a power supply of the external apparatus via a connection cable such as a USB cable or the like, or using electric power supplied from an AC power supply, is known.

However, when the speed of a processing circuit is raised in order to raise reading speed and exploit a high-speed interface effectively, the cost of such circuitry as an image processing circuit and memory rises and there is also an increase in power consumption and unnecessary radiation.

On the other hand, in a processing circuit adapted to operate with a low-speed interface, the high-speed nature of an interface does not manifest itself sufficiently. For example, if a 2-MB buffer memory is constituted by a DRAM, the fact that the DRAM used customarily has a cycle time of 100 ns at the time of random access means that memory access will represent a bottleneck with regard to reading speed when image processing that makes repeated reference to the memory is executed.

Further, minimizing image processing that refers to a memory, such as processing for a shading correction or gamma correction, to thereby reduce the number of times memory is accessed also is effective in outputting image data at high speed. For example, if an analog/digital converter is a 14-bit converter, one available method is to transmit 14-bit raw data to a host computer as is and execute all image processing such as a shading correction using the memory and arithmetic and logical circuitry of the host computer.

In the case of an image sensing apparatus thus constructed, the amount of data is nearly doubled because 14 bits are transmitted. However, merely a high-speed, small buffer memory will suffice because the transmission speed of image data is sufficiently high in comparison with the speed at which image data is generated. However, in a case where a hardware implementation is thus adopted in conformity with the high-speed transmission mode, 14-bit data is transmitted in order to avoid a decline in image quality at such times that it is necessary to use a low-speed transmission mode because of the configuration of the image sensing system. When it is thus attempted to transmit 14-bit data, the total amount of data not only nearly doubles in comparison with the transmission of 8-bit data after image processing but the speed of data generation also increases in comparison with the data transmission speed. As a consequence, the buffer memory soon is filled to capacity, the reading of the image data must be suspended and resumed repeatedly and it is likely that reading speed will diminish to a great degree.

Further, a transmission gear mechanism has not been controlled in accordance with the communication speeds of interfaces conventionally, and thus the apparatus can not sufficiently cope with a wide communication speed range. This may result in a large vibration when operating at low speed and large energy consumption when operating at high speed.

Further, in an image reading apparatus utilized by connecting to an external apparatus such as a computer, when such image reading apparatus operates using electric power supplied from a power supply of an external apparatus, it may fail to operate normally due to insufficient electric power. This problem readily occurs when the external apparatus is driven using a battery.

SUMMARY OF THE INVENTION

The present invention has been made in consideration of the above-mentioned circumstances and has as its object to realize optimum reading speed for a wide range of communication speed by a simple and inexpensive circuit arrangement.

It is another object of the present invention to appropriately control power consumption in correspondence with communication speed of an interface.

According to the present invention, the foregoing object is attained by providing an image sensing apparatus capable of connecting to an external information processing apparatus, comprising: an image sensor adapted to sense an object and output an image signal representing the image of the object; a signal processor adapted to subject the image signal to predetermined signal processing; a communication unit adapted to communicate with the information processing apparatus; and a controller adapted to change over a control method of the signal processor in accordance with the communication speed of the communication unit.

Further, foregoing object is also attained by providing an information processing apparatus capable of controlling an external image sensing apparatus by connecting thereto, the external image sensing apparatus having an image sensor adapted to sense an object and output an image signal representing the image of the object, a signal processor adapted to subject the image signal to predetermined signal processing, and a communication unit adapted to perform communication, the information processing apparatus comprising: a communication unit adapted to communicate with the external image sensing apparatus; a sensor adapted to sense communication speed of the communication unit; a signal processor adapted to subject the image signal, which has been obtained from the image sensing apparatus, to predetermined signal processing; and a controller adapted to perform control so as to change over a method of controlling the signal processor of the external image sensing apparatus in accordance with the communication speed sensed by the sensor, and change over control of the signal processor within the information processing apparatus.

Furthermore, the foregoing object is also attained by a method of controlling an image sensing apparatus having an image sensor adapted to sense an object and output an image signal representing the image of the object, a signal processor adapted to subject the image signal to predetermined signal processing, and a communication unit adapted to perform communication, the method comprising; a sensing step of sensing communication speed of the communication unit; and a control step of performing control so as to change over a method of controlling the signal processor in accordance with the communication speed sensed at the sensing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 25 is a view showing the mechanical arrangement of the image reading apparatus according to the eighth embodiment of the present invention.

DESCRIPTION OF THE PREFERRED EMBODIMENTS

Preferred embodiments of the present invention will be described in detail in accordance with the accompanying drawings. In the embodiments of the invention, an image reading apparatus such as a scanner will be described as an example of an image sensing apparatus. However, the invention is applicable to all image sensing apparatus, such as video cameras and digital still cameras, in which image data can be transmitted to an external information processing apparatus in real time.

<First Embodiment>

Figure 1:
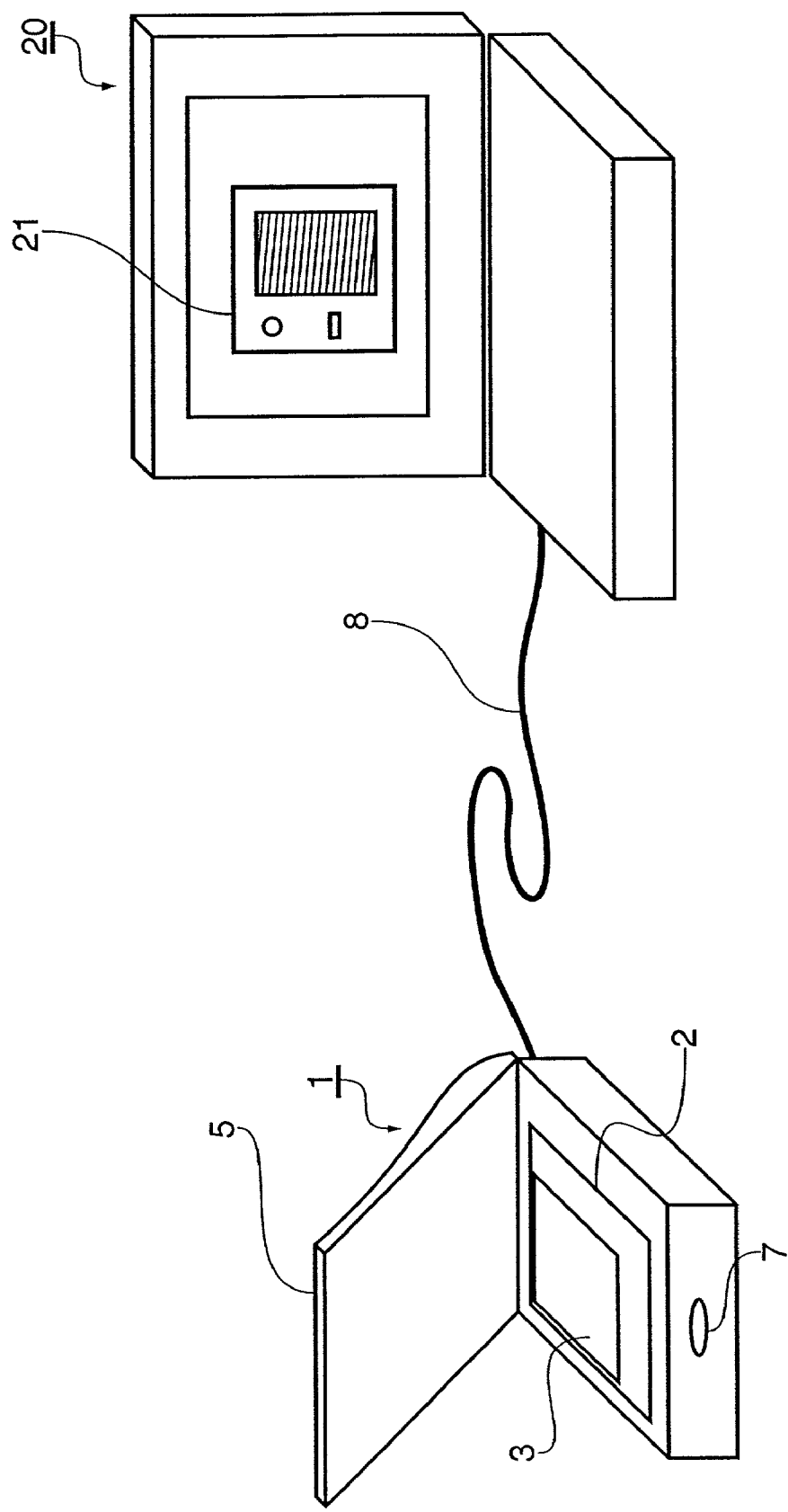
FIG. 1 is a schematic view illustrating the external appearance of an image reading system according to a first embodiment of the present invention.
Figure 2:
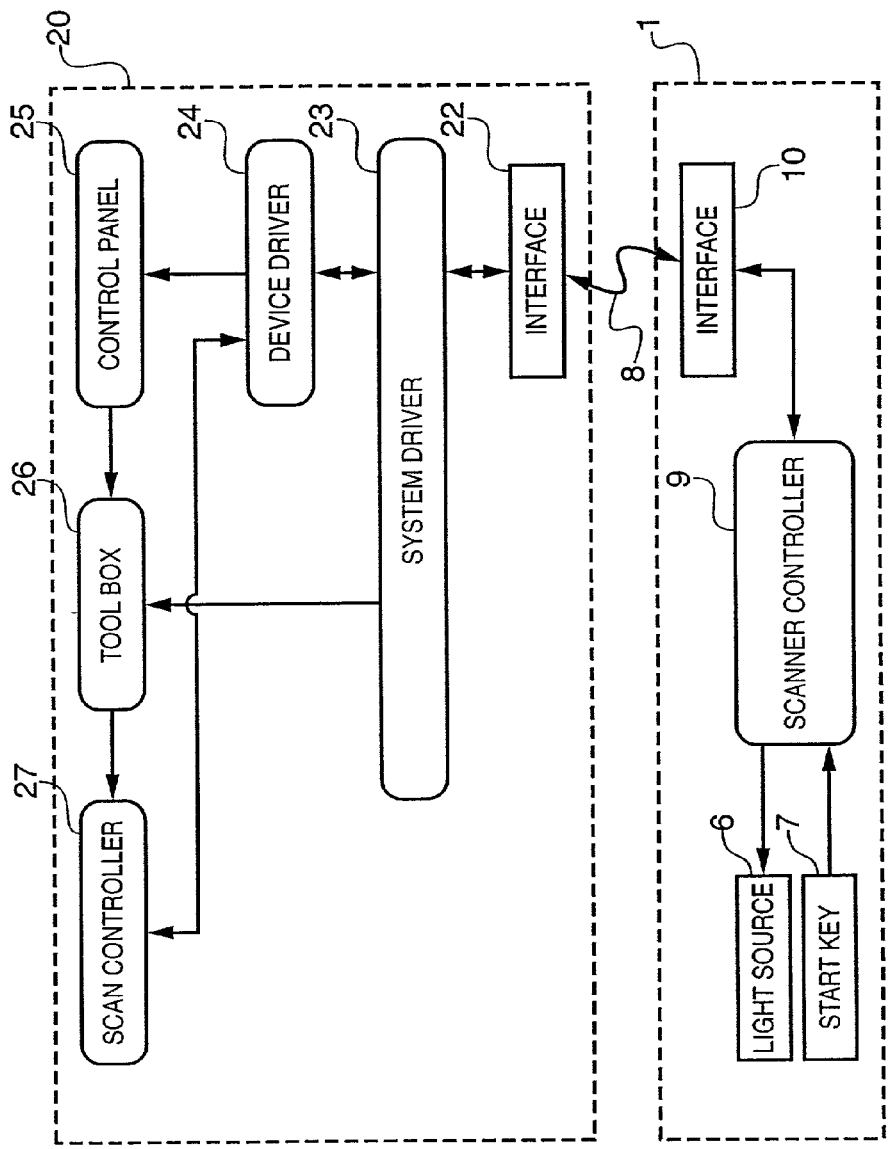
FIG. 2 is a block diagram illustrating the system configuration of software according to the first embodiment.

FIG. 1 is a schematic view illustrating the external appearance of an image reading system according to a first embodiment of the present invention, and FIG. 2 is a block diagram illustrating the system configuration of software of the image reading system in the first embodiment.

As shown in FIG. 1, the system includes an image reading apparatus 1 having a platen glass 2 for holding a document 3, a pressure applying cover 5 and a start key 7 for launching an application and commanding the start of reading. The system further includes a USB interface cable 8 and a host computer 20 having an operating window 21 for the application software.

As shown in FIG. 2, the image reading apparatus 1 further has a light source 6, a scanner controller 9 for controlling the image reading apparatus 1, and a USB interface 10. The host computer 20 includes a USB interface 22, a system driver 23 for controlling various resources in the host computer 20, a device driver 24 for controlling the image reading apparatus 1 in the host computer 20, a control panel 25 for a management program that manages the operating environment, such as the launching and quitting of application software, in the host computer, a tool box 26 of a control program that controls application software for driving the image reading apparatus 1, and a scan controller 27 of an application program for performing an operation relating to image reading by the image reading apparatus 1.

When the USB interface cable 8 is connected in FIG. 2, enumeration is performed between the image reading apparatus 1 and the host computer 20 and the communication speed of the interface is decided. The USB interface 10 on the side of the image reading apparatus 1 subsequently operates at the communication speed decided at this time. The USB interface 22 on the side of the host computer 20 also operates at the communication speed decided at this time.

The sequence of operations performed by the image reading apparatus 1 when an application is launched in the first embodiment of the present invention will now be described with reference to FIG. 3.

Figure 3:
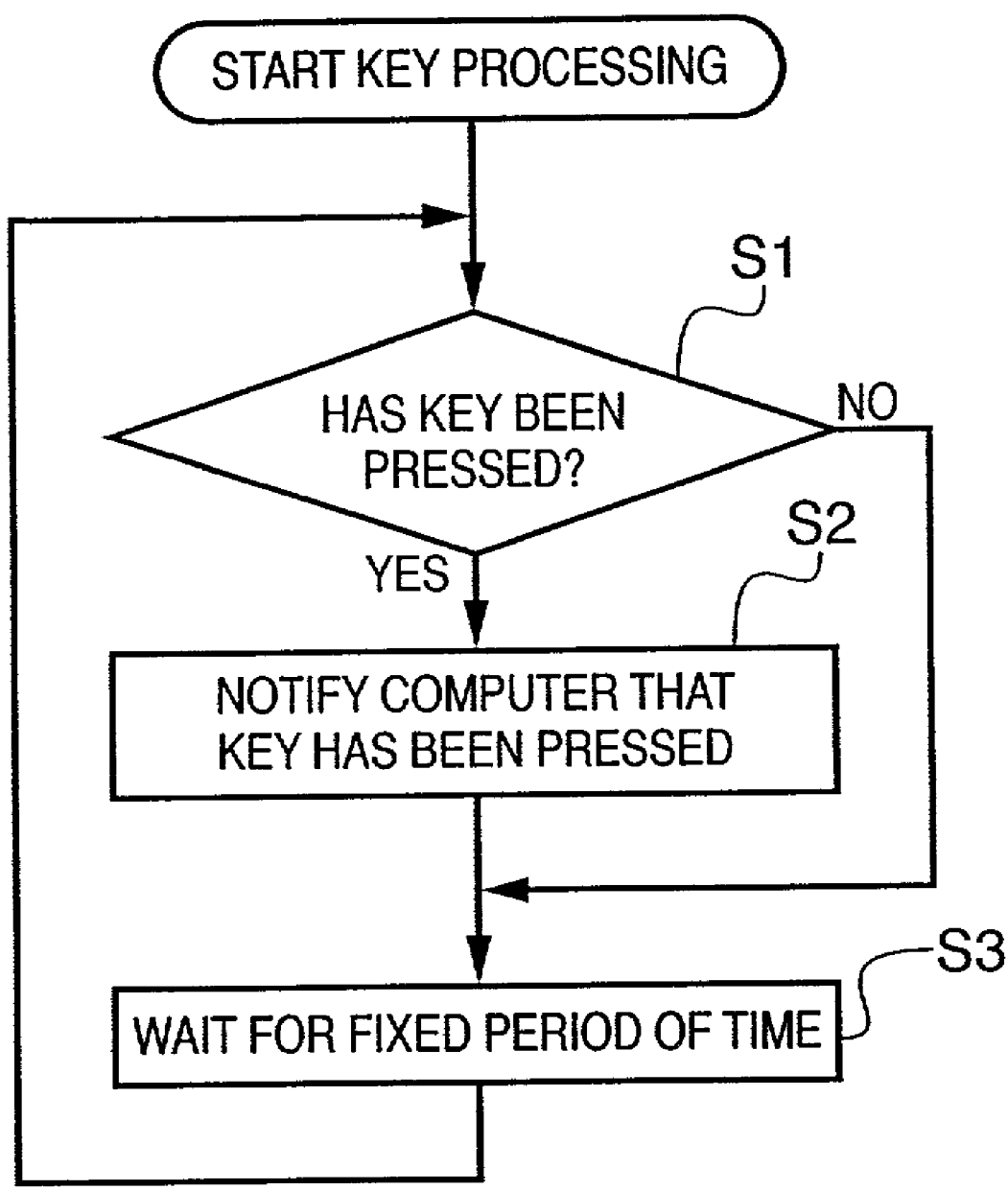
FIG. 3 is a flowchart illustrating the operating sequence of an image reading apparatus when an application is launched according to the first embodiment of the present invention.

FIG. 3 is a flowchart illustrating a sequence in a case where operation of the start key 7 is processed by polling to report this operation to the host computer 20. The scanner controller 9 checks the operating status of the start key 7 periodically. Processing of operation of the start key 7 may be performed by polling from the scan controller 27.

If processing starts, the image reading apparatus 1 checks whether the start key 7 has been pressed at step S1. If the key 7 has been pressed, control proceeds to step S2, where the fact that the key has been pressed is reported to the host computer 20. Control then proceeds to step S3. If the key 7 has not been pressed, on the other hand, then control proceeds directly from step S1 to step S3. Here the image reading apparatus waits for a fixed period of time (e.g., 10 ms) using a timer, after which control returns to step S1.

With regard to the determination as to whether the start key 7 has been pressed at step S1, it is determined that the key has been pressed when the key is held depressed for a fixed period of time following non-depression of the key for a fixed period of time. Conversely, it can be determined that the key has been pressed when the key remains in a non-depressed state for a fixed period of time following continuous depression of the key for a fixed period of time.

FIG. 3 illustrates a method in which notification of operation of the start key 7 is performed by polling. It is also permissible to adopt a method in which depression of the start key 7 is processed by applying a hardware interrupt. In such case the fact that the start key 7 has been pressed is conveyed to the scanner controller 9 by an interrupt signal, and the scanner controller 9 sends information indicating that the start key has been pressed to the host computer 20 via the USB interface 10 by interrupt transfer.

Figure 4:
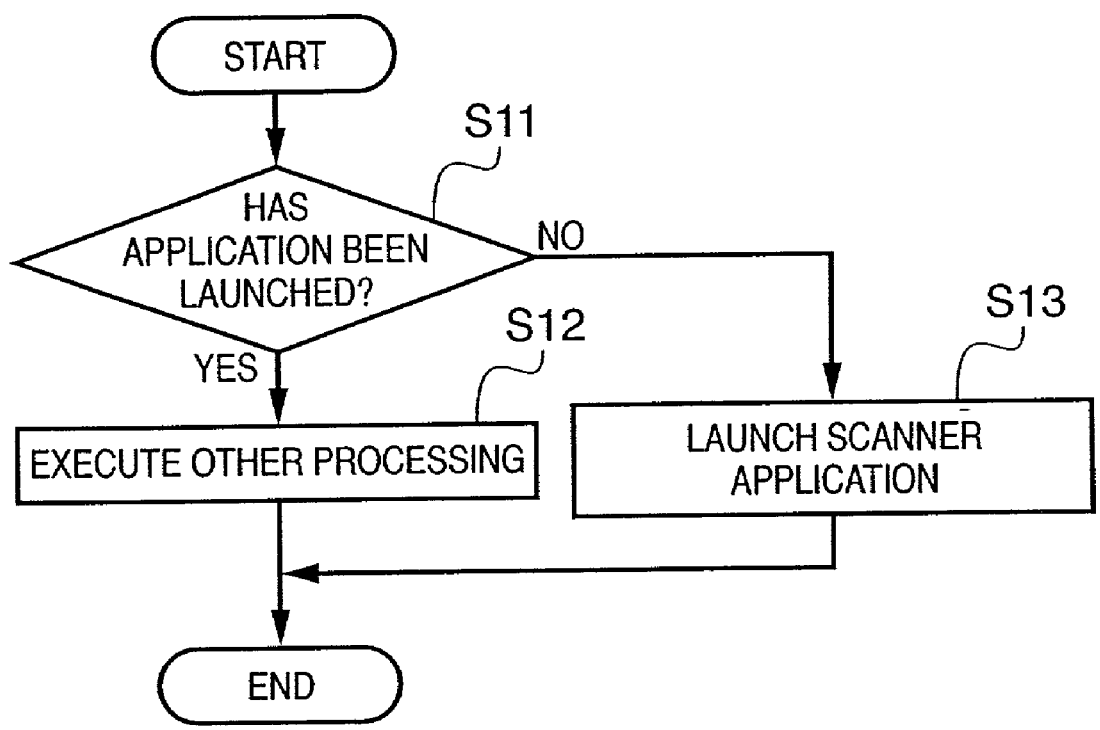
FIG. 4 is a flowchart illustrating the operating sequence of a host computer when an application is launched according to the first embodiment of the present invention.

FIG. 4 is a flowchart useful in describing the operating sequence of the host computer 20 when an application is launched in the first embodiment of the invention. Specifically, FIG. 4 illustrates the sequence of processing by the tool box 26 of a control program that controls the application software of the image reading apparatus 1 in the host computer 20.

When information indicating that the start key 7 has been pressed is transmitted from the image reading apparatus 1 by the processing of FIG. 3, the host computer 20 receives this information by its USB interface 22 via the USB interface cable 8. When the system driver 23 receives the information indicative of depression of the start key from the USB interface 22, this fact is reported to the device driver 24. The latter notifies the control panel 25 to start up the tool box 26.

When the tool box 26 is started up by the control panel 25, the host computer 20 recognizes the fact that the start key 7 of the image reading apparatus 1 has been pressed. The host computer 20 determines at step S11 whether the scan controller 27 has started operating. If the scan controller 27 has started operating, processing corresponding to other start-up factors is executed at step S12. If the scan controller 27 has not started up, control proceeds to step S13. Here the scan controller 27 is started up.

Figure 5:
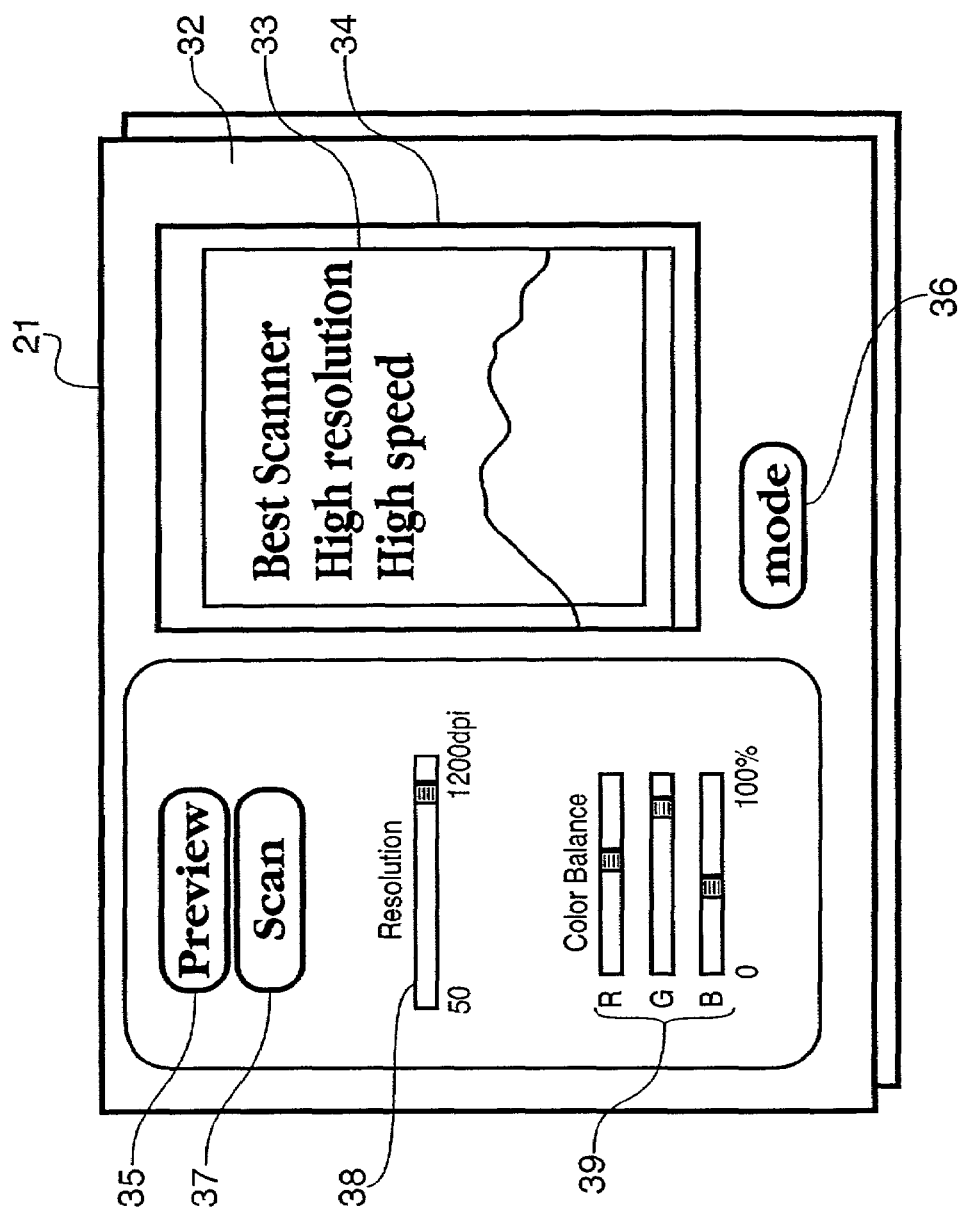
FIG. 5 is a diagram illustrating an example of an operating screen according to the first embodiment.

FIG. 5 is a diagram useful in describing the operating screen of the scan controller 27. This screen is presented on the screen of the host computer 20 when an image is read from a document.

As shown in FIG. 5, an operating window 21 is displayed on the screen of the host computer 20. This operating window is displaying a preview image presented following pre-scanning.

The screen includes a display window 32, a cursor 33 for designating the reading range of a document, a preview screen 34, a preview key 35 for designating start of pre-scanning and obtaining a preview image, a mode setting button 36 for setting a scanning mode such as the gamma characteristic (density-characteristic curve), a main scan start button 37, a resolution setting bar 38 and a color balance setting bar 39. Settings are made and scanning is started by clicking the buttons and dragging the bars using a mouse (not shown) or the like.

Figure 6:
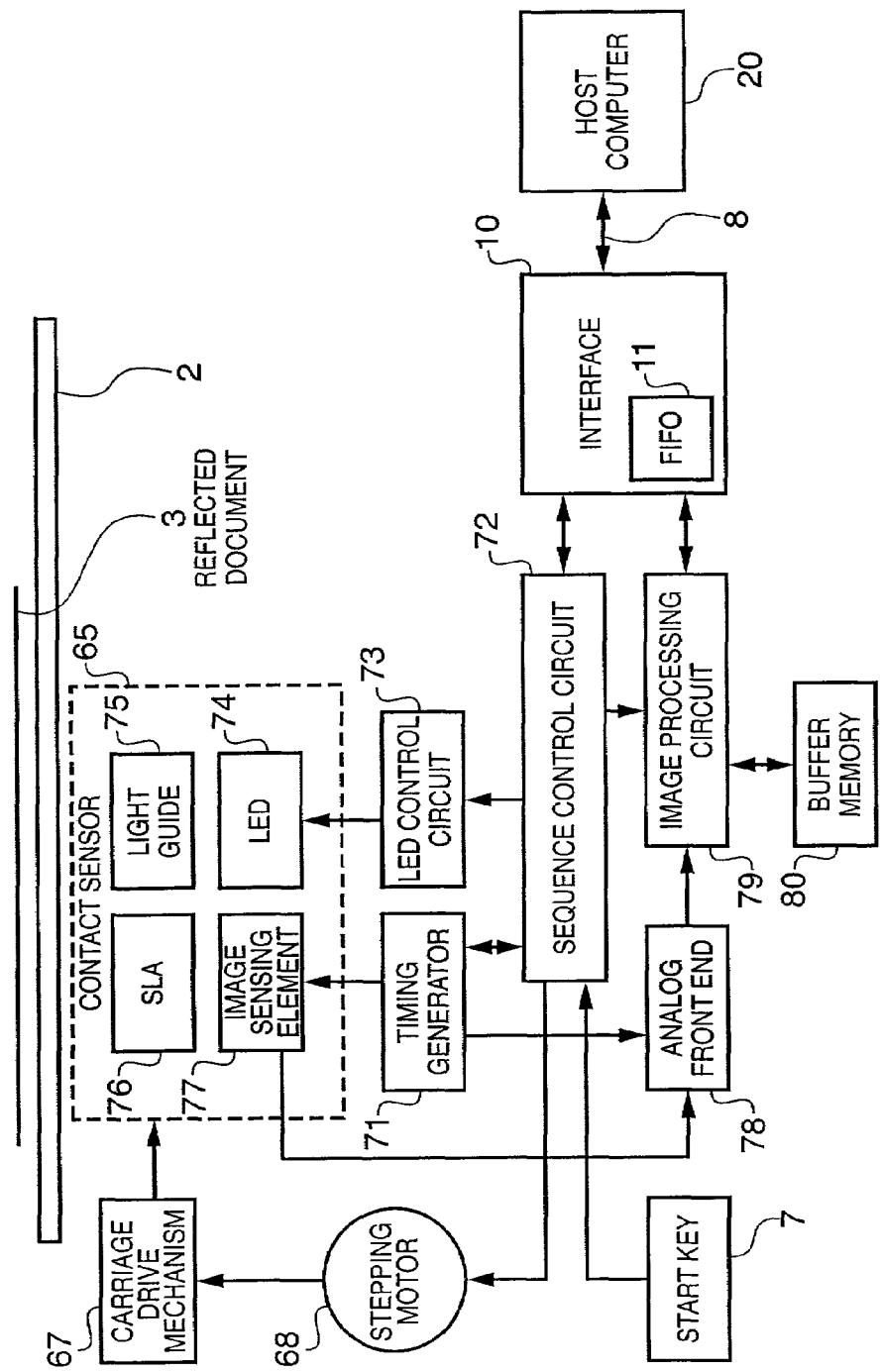
FIG. 6 is a block diagram illustrating the structure of an image reading apparatus according to the first embodiment.

FIG. 6 is a block diagram illustrating the structure of the image reading apparatus 1 according to the first embodiment of the present invention. As shown in FIG. 6, the apparatus 1 includes the platen glass 2 on which the document 3 is placed and the USB interface 10 connected to the host computer 20 by the USB interface cable 8. The host computer 20 executes the control program of the scanner. The image reading apparatus 1 further includes a contact sensor 65 driven in the sub-scanning direction, a carriage drive mechanism 67 for performing scanning in the sub-scanning direction by driving the contact sensor 65 in the sub-scanning direction, a stepping motor 68 for moving the contact sensor 65 in the sub-scanning scanning direction via the carriage drive mechanism 67, a timing generator 71 for generating timing clock signals necessary for the contact sensor 65, an image processing circuit, and the like, a sequence control circuit 72 for performing a series of sequence control operations, such as motor control and control for turning lamps on and off in accordance with values that have been set from the host computer 20 via the USB interface 10, an LED control circuit 73 for controlling the lighting of LEDs, an LED 74 for illuminating the document, a light guide 75 for illuminating the document, imaging optics (SLA) 76 for introducing the image of the document, which has been placed on the platen glass 2, onto an image sensing element 77 that is for reading the image, an analog circuit 78 (referred to generally as an analog front end (AFE)) that includes an A/D converter for converting the output analog signal of the image sensing element 77 to a digital signal, an image processing circuit 79 for executing a shading correction, a gamma correction and scaling processing, etc., and a buffer memory 80 used for image processing and to transfer image data.

The contact sensor 65 carries the LED 74 for illuminating the document, the light guide 75, the imaging optics 76 and the image sensing element 77. The sequence control circuit 72 controls the stepping motor 68 in accordance with values set from the host computer 20 via the USB interface 10 and moves the contact sensor 65 in the sub-scanning scanning direction via the carriage drive mechanism 67. The set values are the pulse rate and rotating direction, etc., of the stepping motor 68.

Control of the image reading apparatus 1 having the structure set forth above will now be described.

Figure 7:
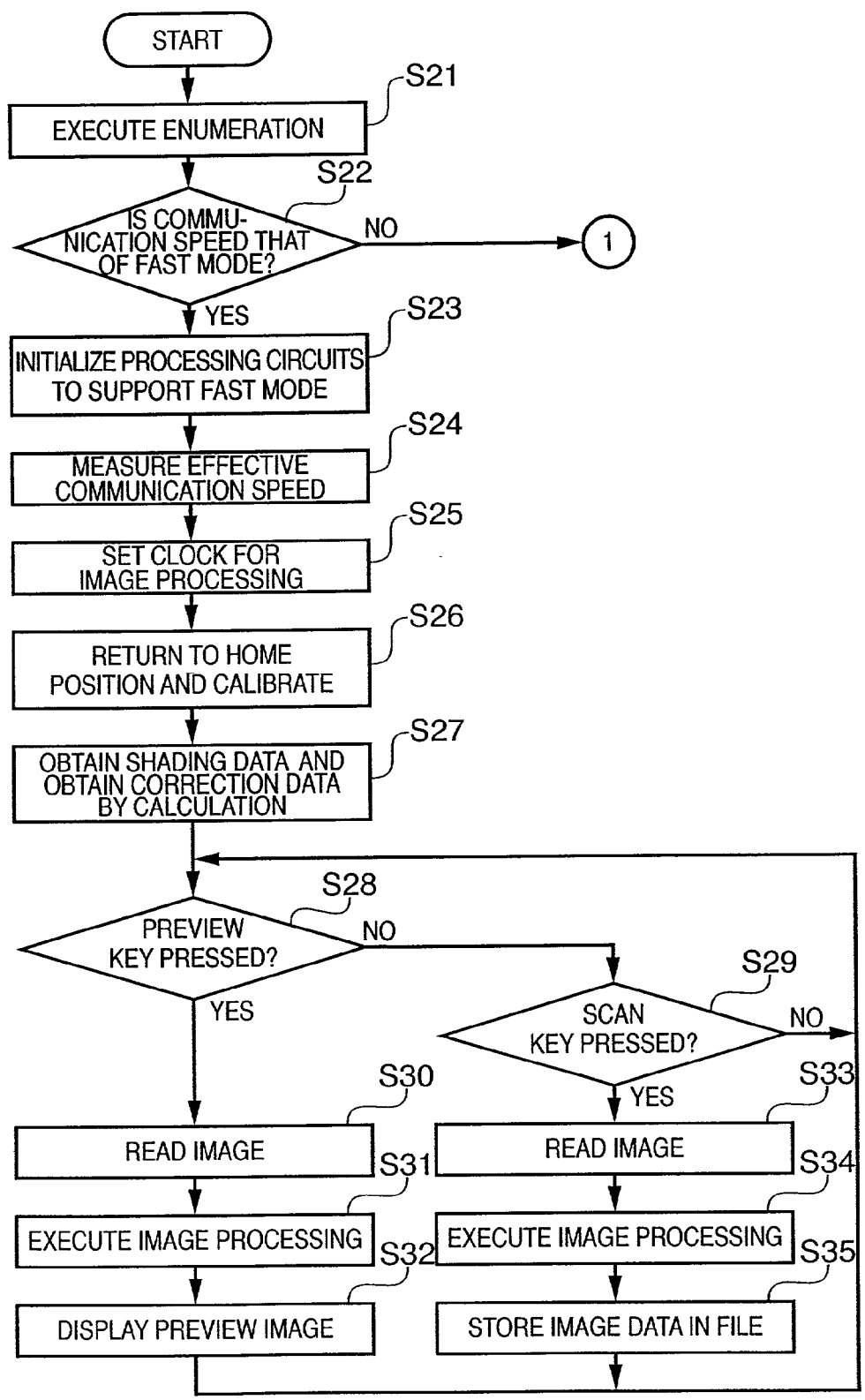
FIG. 7 is a flowchart illustrating reading control by the host computer according to the first embodiment.
Figure 8:
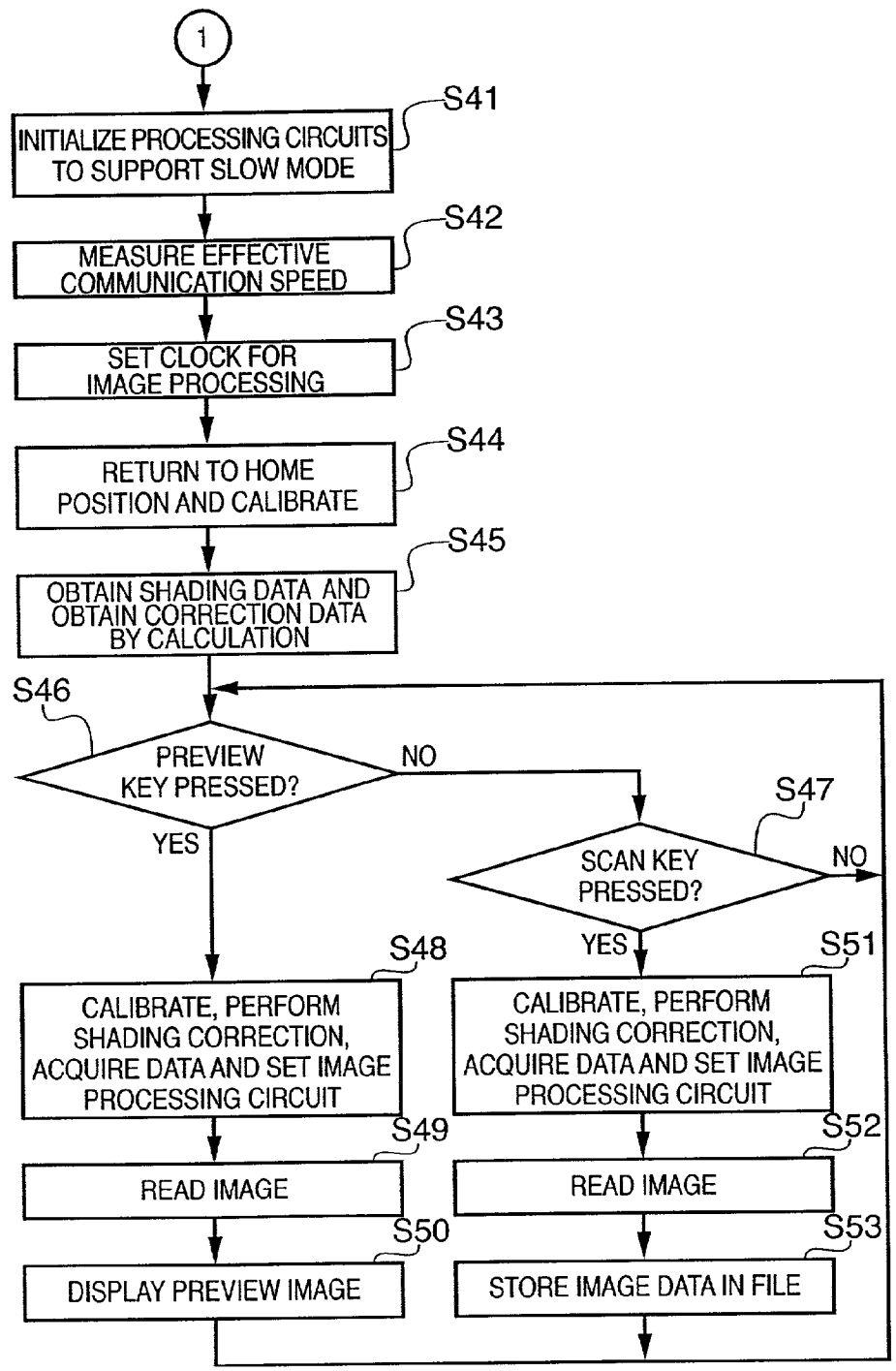
FIG. 8 is a flowchart illustrating reading control by the host computer according to the first embodiment.

FIGS. 7 and 8 are flowcharts illustrating the control program in a case where control of reading by the image reading apparatus 1 is performed by the host computer 20 in accordance with the first embodiment.

The driver control sequence will be described with reference to FIGS. 7 and 8.

First, if the USB interface cable 8 is connected or power is introduced to the host computer 20, enumeration is carried out at step S21 to recognize the device connected to the interface, assign addresses and decide the communication speed. The method of deciding the communication speed of the USB interface has been standardized. Since an image input apparatus of the present invention is assumed to support USB 2.0, if the host computer supports USB 2.0, the communication speed, therefore, is placed in the high-speed (fast) mode (480 Mbps). On the other hand, in a case where the host computer supports USB 1.1 but not support USB 2.0, the communication speed is decided on as being full-speed (slow) mode (12 Mbps). Here it is assumed that the image reading apparatus 1 has been connected. Further, if the image reading apparatus and the host computer support IEEE 1394 and other devices have been connected between the host computer and the image reading apparatus, then the communication speed is set to the speed of the device whose communication speed is lowest. For example, assume that the communication speed of an IEEE-1394 interface of the host computer is 400 MHz. If the host computer has been connected to a mass storage device whose communication speed is 200 MHz and the mass storage device has been connected to a 400-MHz image reading apparatus, the communication speed of the image reading apparatus is determined to be 200 MHz.

Next, when the device driver 24 for the image reading apparatus 1 is started up in the host computer 20, the device driver 24 discriminates whether the communication speed is that of a fast mode or that of a slow mode at step S22. Specifically, the device driver 24 makes this determination by obtaining information relating to the communication mode (communication speed) of the applicable communication channel from the system driver 23 after the communication speed is decided. After the communication speed has been determined, the device driver 24 of the host computer 20 changes over the set values of the image processing circuit 79 or control of the sequence control circuit 72 in accordance with the communication speed. Control proceeds to step S23 when the communication speed is that of the fast mode and to step S41 (FIG. 8) when the communication speed is that of the slow mode.

When the communication speed is that of the fast mode, each of the processing circuits of the image reading apparatus 1 is initialized with respect to the fast mode (step S23). For example, a setting is made to bypass the shading correction, gamma correction and scaling by the image processing circuit 79, and a setting is made in such a manner that 14-bit data output from the analog front end will be output to a data-transmission FIFO 11 incorporated in the USB interface 10. The effective speed of communication between the image reading apparatus 1 and the host computer 20 in the fast mode is measured at step S24.

Next, at step S25, a clock of the timing generator 71 is set based upon the effective speed of communication. The contact sensor 65 is returned to the home position, after which calibration is performed (step S26).

This is followed by step S27, at which the host computer 20 obtains white shading data and black shading data and obtains correction data by calculation.

Next, at step S28, it is determined whether the preview key 35 of the operating window 21 has been pressed. Control proceeds to step S30 if the preview key 35 has been pressed and to step S29 if it has not.

The image is read coarsely (i.e., at a low resolution) at step S30 in order to obtain a preview image, and raw data representing the image. i.e., 14-bit data that is output from the analog front end, is transmitted to the host computer 20 as is. The device driver 24 subjects the transmitted preview image data to predetermined image processing such as a shading correction at step S31 and displays the image data thus processed on the preview screen 34 at step S32. Control then returns to step S28.

It is determined at step S29 whether the main scan start button 37 on the operating window 21 has been pressed. Control proceeds to step S33 if the main scan start button 37 has been pressed and returns to step S28 if it has not.

The image is read by main scanning at step S33 and the raw data representing the image is transmitted to the host computer 20. The device driver 24 subjects the transmitted image data to predetermined processing such as a shading correction at step S34 and stores the processed image data in a file at step S35. Control then returns to step S28.

When it is judged that the communication speed is that of the slow mode ("NO" at step S22), control proceeds to step S41 in FIG. 8. Here each of the processing circuits of the image reading apparatus 1 is initialized with respect to the slow mode. For example, a setting is made so that the shading correction, gamma correction and scaling are performed by the image processing circuit 79, and a setting is made in such a manner that 8-bit data that is output from the image processing circuit 79 will be output to the data-transmission FIFO 11 incorporated in the USB interface 10. The effective speed of communication between the image reading apparatus 1 and the host computer 20 in the slow mode is measured at step S42.

Next, at step S43, a clock of the timing generator 71 is set based upon the effective speed of communication. The contact sensor 65 is returned to the home position, after which calibration is performed (step S44).

This is followed by step S45, at which the host computer obtains white shading data and black shading data and obtains correction data by calculation.

Next, at step S46, it is determined whether the preview key 35 of the operating window 21 has been pressed. Control proceeds to step S48 if the preview key 35 has been pressed and to step S47 if it has not.

Calibration data corresponding to the resolution of the preview image is obtained and the setting of shading correction data, gamma correction data and scaling factor is performed at step S48. This is followed by step S49, at which the image is read, the read image data is subjected to predetermined image processing such as a correction by the image processing circuit 79 and the processed image data is transmitted to the host computer 20. The host computer 20 displays the received image data on the preview screen at step S50. Control then returns to step S46.

It is determined at step S47 whether the main scan start button 37 on the operating window 21 has been pressed. Control proceeds to step S51 if the main scan start button 37 has been pressed and returns to step S46 if it has not.

Calibration data corresponding to the resolution of main scanning is obtained and the setting of shading correction data, gamma correction data and scaling factor is performed at step S51. This is followed by step S52, at which the image is read, the read image data is subjected to predetermined image processing such as a correction by the image processing circuit 79 and the processed image data is transmitted to the host computer 20. The host computer 20 stores the received image data in a file at step S53. Control then returns to step S46.

Thus, in accordance with the first embodiment as described above, the method of controlling the processing circuits, e.g., the method of image processing performed by the image processing circuit 79 and the method of controlling scanning of the sequence control circuit 72, are changed in accordance with the speed of communication between the image reading apparatus 1 and the host computer 20. As a result, the optimum reading speed can be realized in both the slow mode and fast mode by a simple and inexpensive circuit arrangement.

<Second Embodiment>

Next, the second embodiment of the present invention will be described.

Figure 9:
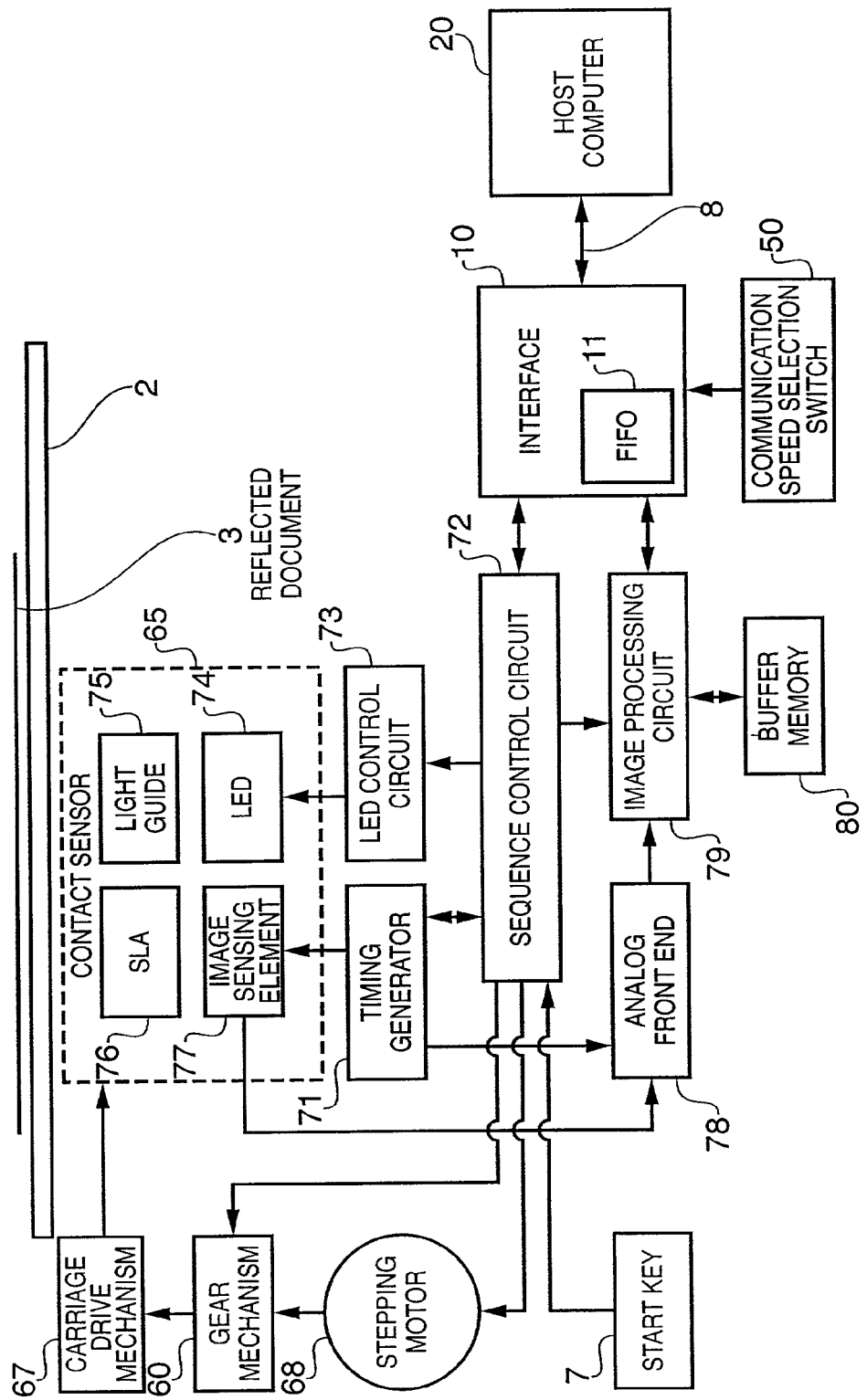
FIG. 9 is a block diagram illustrating the structure of an image reading apparatus according to a second embodiment of the present invention.

An image reading apparatus according to the second embodiment is shown in FIG. 9. As shown in FIG. 9, a communication speed selection switch 50 for switching the communication speed of the interface 10 and a gear mechanism 60 for changing the moving speed of the contact sensor 65 are added to the configuration shown in FIG. 6. The other configuration are the same as those described in the first embodiment, and thus referred to by the same reference numerals and explanation of them are omitted.

Figure 10:
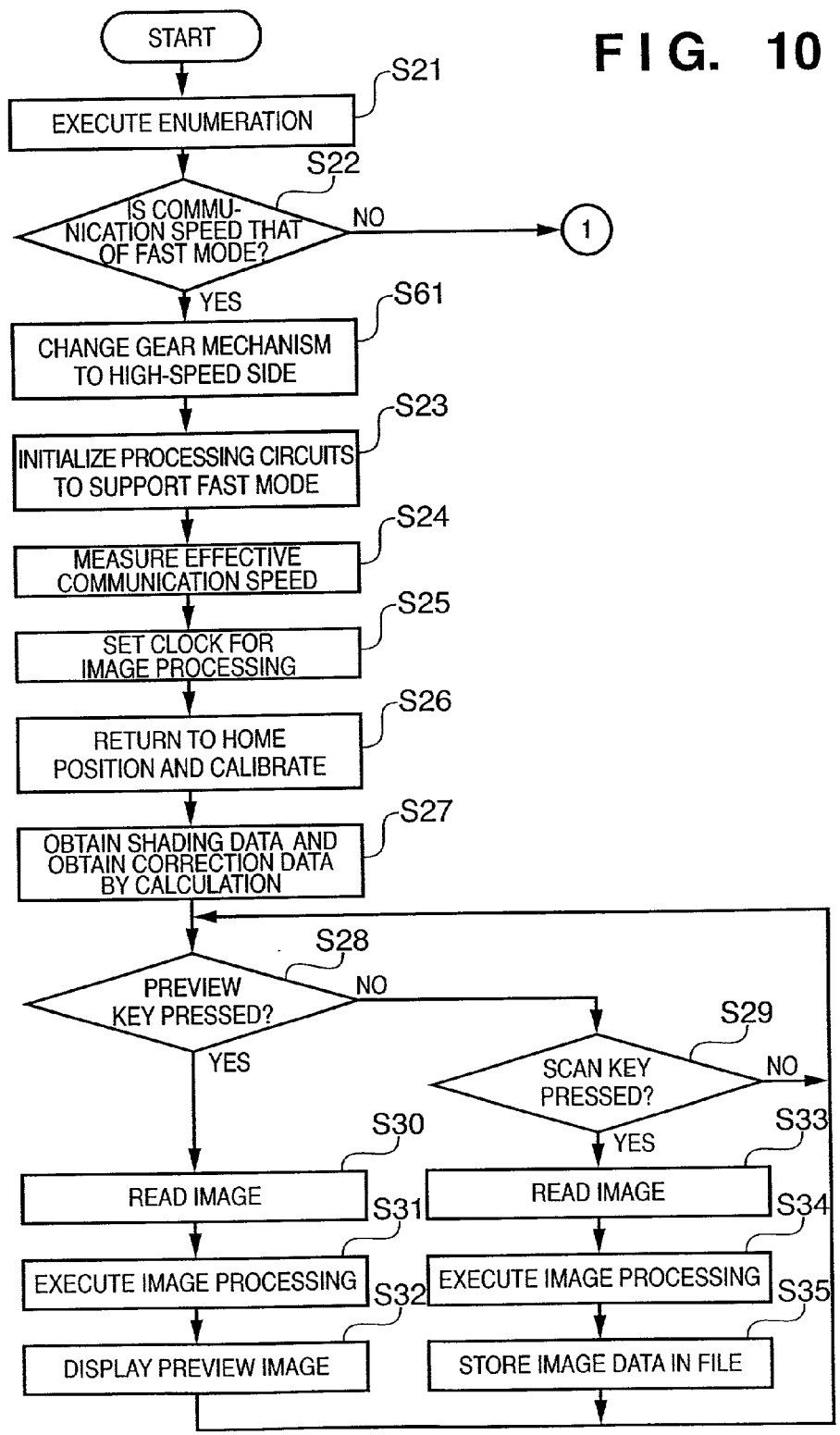
FIG. 10 is a flowchart illustrating reading control by a host computer according to the second embodiment.
Figure 11:
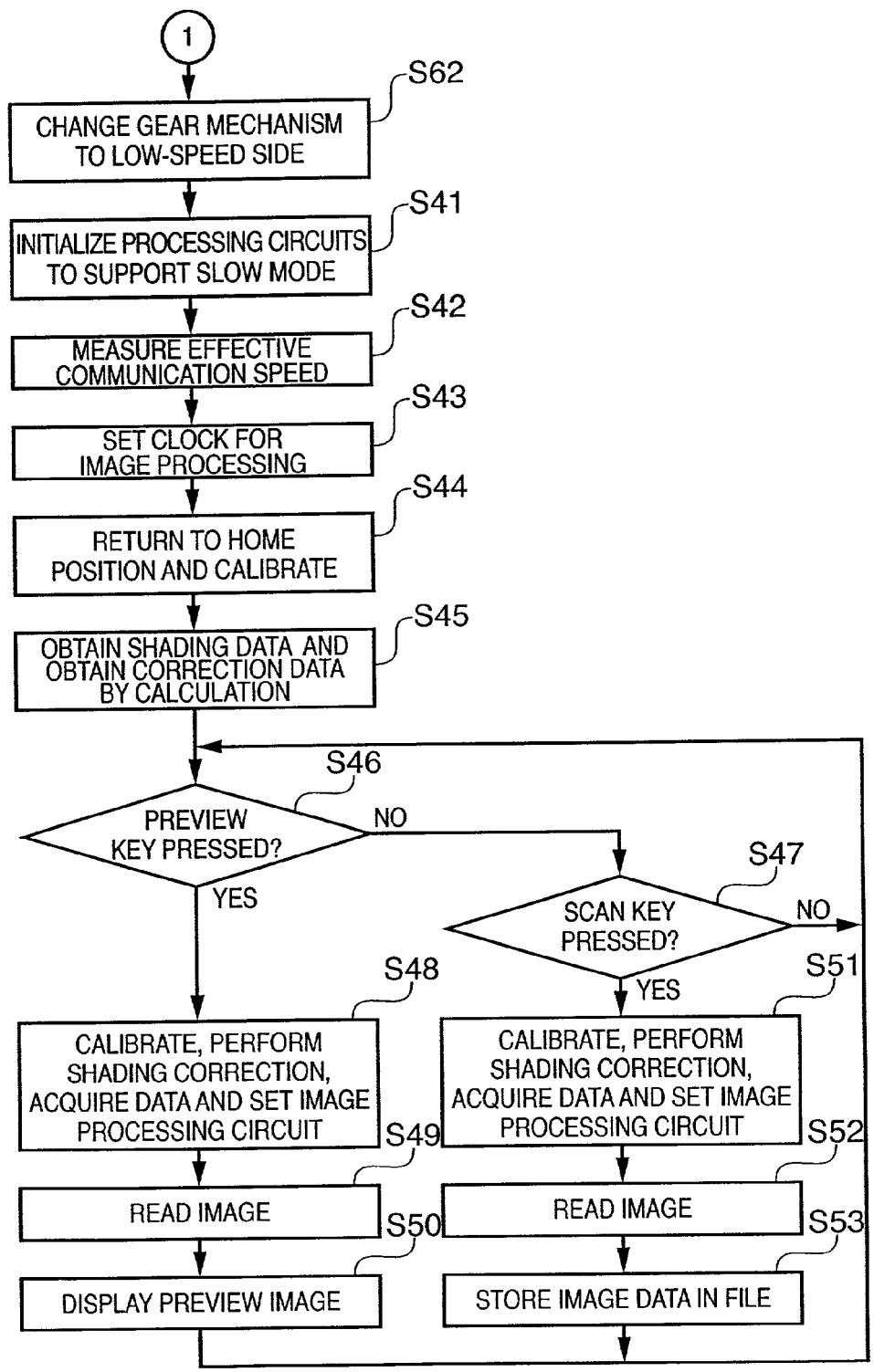
FIG. 11 is a flowchart illustrating reading control by a host computer according to the second embodiment.

FIGS. 10 and 11 are flowcharts illustrating the control in a case where control of reading by the image reading apparatus 1 is performed by the host computer 20 in the image reading system having the aforesaid configuration. It should be noted that the same processes as those shown in FIGS. 7 and 8 of the first embodiment are referred to by the same step numbers, and explanation of those processes will be partially omitted.

First, if the USB interface cable 8 is connected or power is introduced to the host computer 20, enumeration is carried out at step S21 to recognize the device connected to the interface, assign addresses and decide the communication speed. In the second embodiment, the communication speed of the image reading apparatus 1 can be decided by the communication speed selection switch 50. If the communication speed selection switch 50 selects the high-speed mode, then the interface 10 notifies the host compute 20 that the image reading apparatus 1 operates in the high-speed mode at the time of enumeration. If the communication speed selection switch 50 does not select the high-speed mode, then the interface 10 notifies the host computer 20 that the image reading apparatus 1 does not operate in the high-speed mode at the time of enumeration.

Next, when the device driver 24 for the image reading apparatus 1 is started up in the host computer 20, the device driver 24 discriminates whether the communication speed is that of a fast (high-speed) mode or that of a slow (full-speed) mode at step S22.

If the communication speed is discriminated as that of the fast mode, the gear mechanism 60 is changed to a high-speed side at step S61, and control proceeds to step S23. Whereas, if the communication speed is discriminated as that of the slow mode, control proceeds to step S62 in FIG. 11.

At step S23, each of the processing circuits of the image reading apparatus 1 is initialized with respect to the fast mode (step S23). For example, a setting is made to bypass the shading correction, gamma correction and scaling by the image processing circuit 79, and a setting is made in such a manner that 14-bit data output from the analog front end 78 will be output to a data-transmission FIFO 11 incorporated in the USB interface 10. The effective speed of communication between the image reading apparatus 1 and the host computer 20 in the fast mode is measured at step S24.

Next, at step S25, a clock of the timing generator 71 is set based upon the effective speed of communication. The contact sensor 65 is returned to the home position, after which calibration is performed (step S26).

This is followed by step S27, at which the host computer 20 obtains white shading data and black shading data and obtains correction data by calculation.

Next, at step S28, it is determined whether the preview key 35 of the operating window 21 has been pressed. Control proceeds to step S30 if the preview key 35 has been pressed and to step S29 if it has not.

The image is read coarsely (i.e., at a low resolution) at step S30 in order to obtain a preview image, and raw data representing the image. i.e., 14-bit data that is output from the analog front end 78, is transmitted to the host computer 20 as is, and the contact sensor 65 is returned to the home position. The device driver 24 subjects the transmitted preview image data to predetermined image processing such as a shading correction at step S31 and displays the image data thus processed on the preview screen 34 at step S32. Control then returns to step S28.

It is determined at step S29 whether the main scan start button 37 on the operating window 21 has been pressed. Control proceeds to step S33 if the main scan start button 37 has been pressed and returns to step S28 if it has not.

The image is read by main scanning at step S33 and the raw data representing the image is transmitted to the host computer 20, and the contact sensor 65 is returned to the home position. The device driver 24 subjects the transmitted image data to predetermined processing such as a shading correction at step S34 and stores the processed image data in a file at step S35. Control then returns to step S28.

When it is judged that the communication speed is that of the slow mode ("NO" at step S22), control proceeds to step S62 in FIG. 11. At step S62, the gear mechanism 60 is changed to a slow-speed side. This is followed by step S41 where each of the processing circuits of the image reading apparatus 1 is initialized with respect to the slow mode. For example, a setting is made so that the shading correction, gamma correction and scaling are performed by the image processing circuit 79, and a setting is made in such a manner that 8-bit data that is output from the image processing circuit 79 will be output to the data-transmission FIFO 11 incorporated in the USB interface 10. The effective speed of communication between the image reading apparatus 1 and the host computer 20 in the slow mode is measured at step S42.

Next, at step S43, a clock of the timing generator 71 is set based upon the effective speed of communication. The contact sensor 65 is returned to the home position, after which calibration is performed (step S44).

This is followed by step S45, at which the host computer obtains white shading data and black shading data and obtains correction data by calculation.

Next, at step S46, it is determined whether the preview key 35 of the operating window 21 has been pressed. Control proceeds to step S48 if the preview key 35 has been pressed and to step S47 if it has not.

Calibration data corresponding to the resolution of the preview image is obtained and the setting of shading correction data, gamma correction data and scaling factor is performed at step S48. This is followed by step S49, at which the image is read, the read image data is subjected to predetermined image processing such as a correction by the image processing circuit 79 and the processed image data is transmitted to the host computer 20, and the contact sensor 65 is returned to the home position. The host computer 20 displays the received image data on the preview screen at step S50. Control then returns to step S46.

It is determined at step S47 whether the main scan start button 37 on the operating window 21 has been pressed. Control proceeds to step S51 if the main scan start button 37 has been pressed and returns to step S46 if it has not.

Calibration data corresponding to the resolution of main scanning is obtained and the setting of shading correction data, gamma correction data and scaling factor is performed at step S51. This is followed by step S52, at which the image is read at a speed based on the resolution, the read image data is subjected to predetermined image processing such as a correction by the image processing circuit 79 and the processed image data is transmitted to the host computer 20, and the contact sensor 65 is returned to the home position. The host computer 20 stores the received image data in a file at step S53. Control then returns to step S46.

Thus, in accordance with the second embodiment as described above, whether the communication speed set by the communication speed selection switch 50 is that of the fast (high-speed) mode or the slow (full-speed) mode is determined, and the transmission gear ratios and the method of controlling the driving source included in a driver are changed in accordance with the determined communication speed. As a result, low vibration and the optimum reading speed can be realized in both the slow mode and fast mode by a simple and inexpensive motor.

<Third Embodiment>

Figure 12:
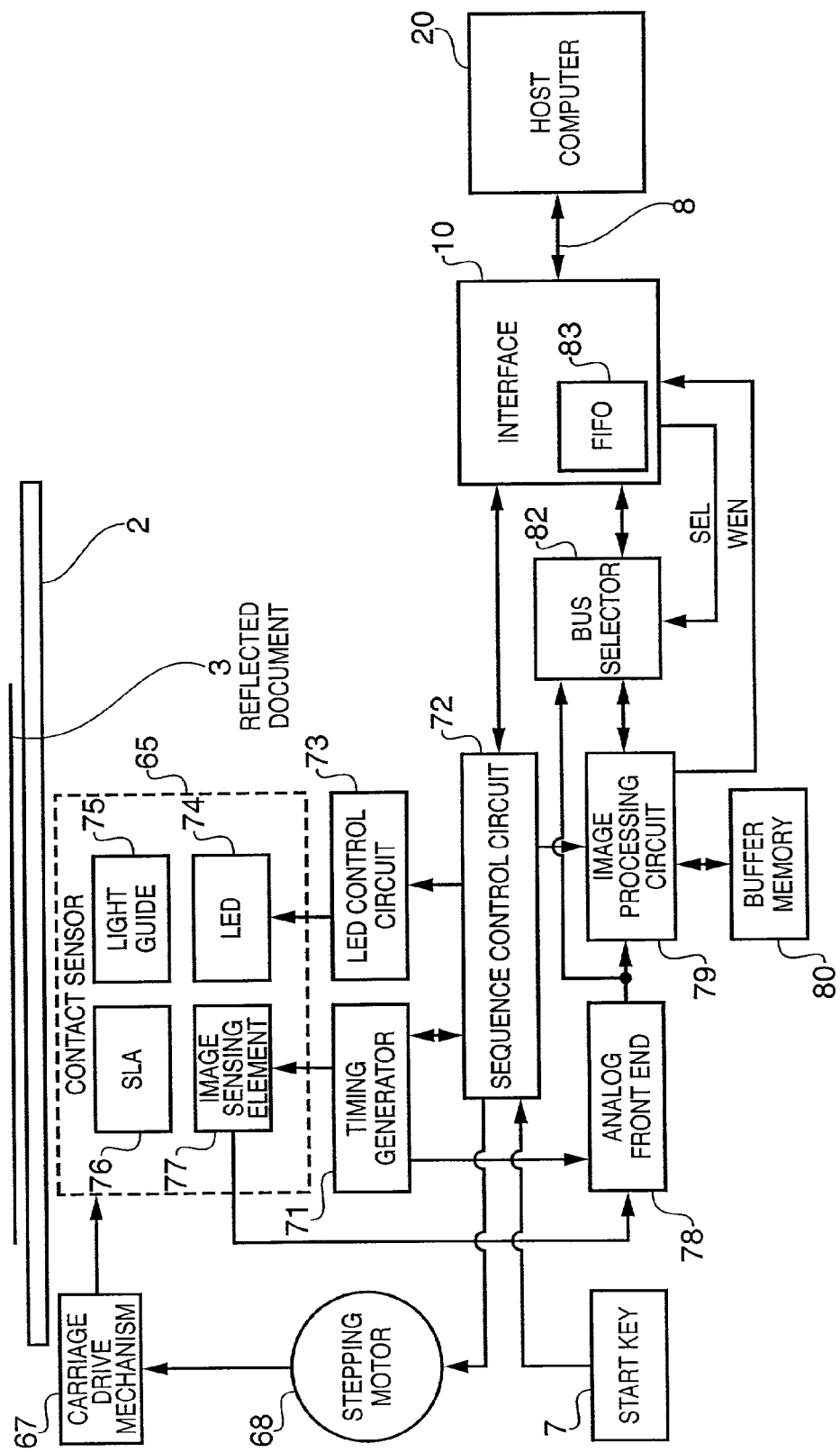
FIG. 12 is a block diagram illustrating the structure of an image reading apparatus according to a third embodiment of the present invention.

FIG. 12 is a block diagram illustrating the structure of an image reading apparatus according to a third embodiment of the present invention. Components in FIG. 12 identical with those shown in FIG. 6 are designated by like reference characters and need not be described again.

It should be noted that the output of the analog front end 78 is assumed to have a bus width of 16 bits. Further, the image reading apparatus 1 of the third embodiment further includes a bus selector 82 for changing over a bus signal with a bus width of 16 bits, and a FIFO memory 83 capable of being accessed at high speed and having a bus width of 16 bits. The FIFO memory 83 is included in the USB interface 10 and is used to adjust timing for transmission of image data.

A bus selection signal SEL, which corresponds to the communication mode, is output to the bus selector 82 from the interface 10. The slow mode is the default mode.

A write-control signal WEN, which indicates the effective image data output to the USB interface 10, is output to the USB interface 10 from the image processing circuit 79.

When the communication speed is high, the image data output from the analog front end 78 bypasses the image processing circuit 79 and enters the high-speed FIFO memory 83, which is provided within the USB interface 10, via the bus selector 82. The write-control signal WEN indicative of the effective image data is output from the image processing circuit 79 to the USB interface 10.

When the communication speed is low, the image data output from the analog front end 78 is subjected to a shading correction, gamma correction and scaling processing by the image processing circuit 79, and the processed image data is input to the high-speed FIFO memory 83 in interface 10 via the bus selector 82.

Effects similar to those of the first embodiment can be obtained by the arrangement of the third embodiment.

<Fourth Embodiment>

Next, the fourth embodiment of the present invention will be described.

Figure 13:
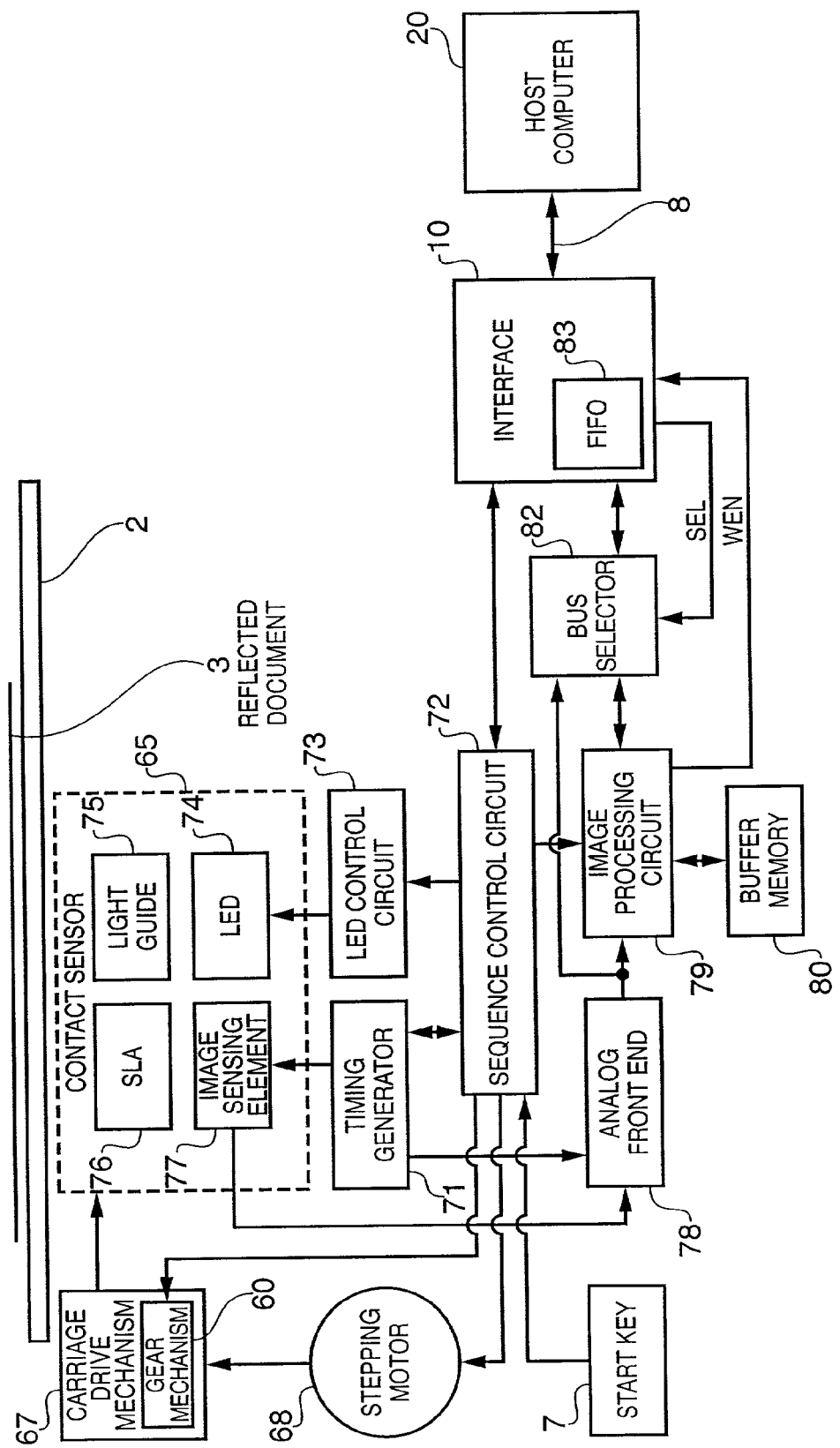
FIG. 13 is a block diagram illustrating the structure of an image reading apparatus according to a fourth embodiment of the present invention.

An image reading apparatus according to the second embodiment is shown in FIG. 13. As shown in FIG. 13, a gear mechanism 60 is added within the carriage drive mechanism 67 to the configuration shown in FIG. 12. The other configuration are the same as those shown in FIG. 12, and thus referred to by the same reference numerals and explanation of them are omitted. The default mode of the bus selection signal SEL for the bus selector 82 is the fast mode in the fourth embodiment.

Figure 14:
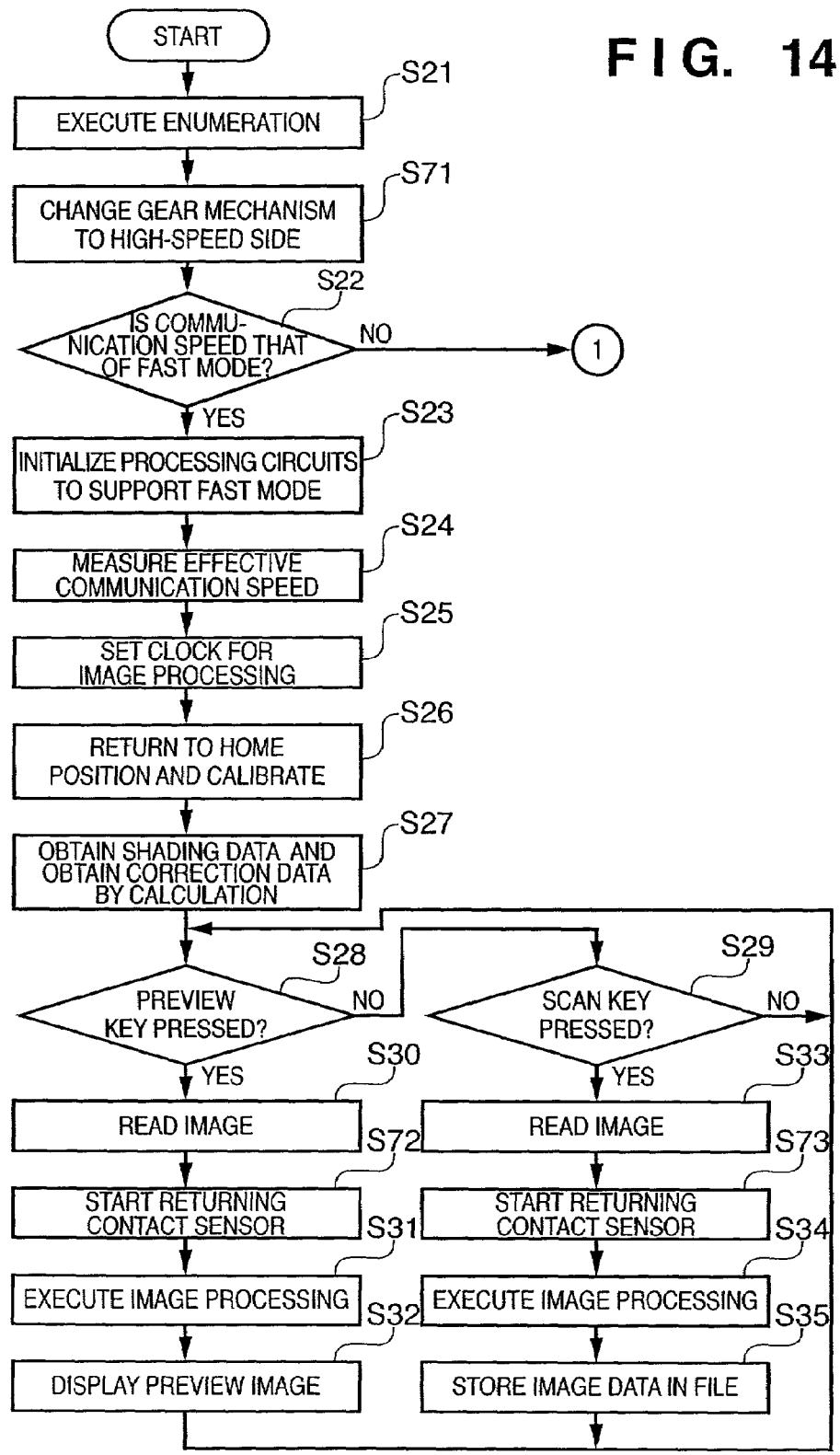
FIG. 14 is a flowchart illustrating reading control by a host computer according to the fourth embodiment.
Figure 15:
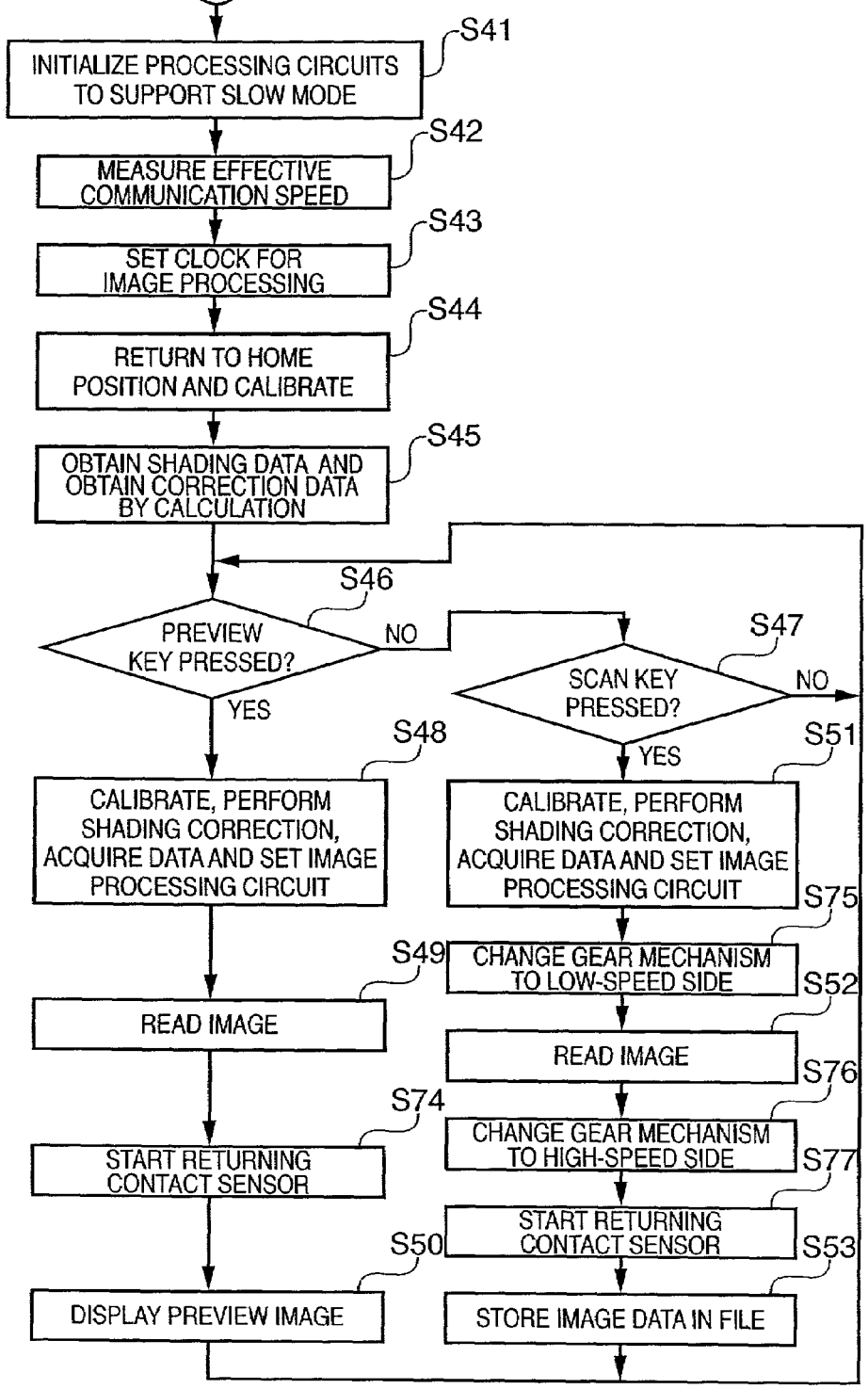
FIG. 15 is a flowchart illustrating reading control by a host computer according to the fourth embodiment.

Next, a sequence controlled by the host computer 20 according to the fourth embodiment is explained with reference to FIGS. 14 and 15. It should be noted that the same processes as those shown in FIGS. 7 and 8 of the first embodiment are referred to by the same step numbers, and explanation of those processes will be partially omitted.

First, if the USB interface cable 8 is connected or power is introduced to the host computer 20, enumeration is carried out at step S21 to recognize the device connected to the interface, assign addresses and decide the communication speed.

Next, when the device driver 24 for the image reading apparatus 1 is started up in the host computer 20, the gear mechanism 60 is changed to a high-speed side at step S71. Then, the device driver 24 discriminates whether the communication speed is that of a fast mode or that of a slow mode at step S22. When the communication speed is that of the fast mode, control proceeds to step S23, whereas when the communication speed is that of the slow mode, control proceeds to step S41 in FIG. 15.

At step S23, each of the processing circuits of the image reading apparatus 1 is initialized with respect to the fast mode. For example, a setting is made to bypass the shading correction, gamma correction and scaling by the image processing circuit 79, and a setting is made in such a manner that 16-bit data output from the analog front end 78 will be output to a data-transmission FIFO 83 incorporated in the USB interface 10. Note that the timing generator 71 is set to generate a fast driving clock for the image sensing element 77. The effective speed of communication between the image reading apparatus 1 and the host computer 20 in the fast mode is measured at step S24.

Next, at step S25, a clock of the timing generator 71 is set based upon the effective speed of communication. The contact sensor 65 is returned to the home position, after which calibration is performed (step S26).

This is followed by step S27, at which the host computer 20 obtains white shading data and black shading data and obtains correction data by calculation.

Next, at step S28, it is determined whether the preview key 35 of the operating window 21 has been pressed. Control proceeds to step S30 if the preview key 35 has been pressed and to step S29 if it has not.

The image is read coarsely (i.e., at a low resolution) at step S30 in order to obtain a preview image, and raw data representing the image. i.e., 16-bit data that is output from the analog front end 78, is transmitted to the host computer 20 as is, and returning of the contact sensor 65 to the home position starts at step S72. The device driver 24 subjects the transmitted preview image data to predetermined image processing such as a shading correction at step S31 and displays the image data thus processed on the preview screen 34 at step S32. Control then returns to step S28.

It is determined at step S29 whether the main scan start button 37 on the operating window 21 has been pressed. Control proceeds to step S33 if the main scan start button 37 has been pressed and returns to step S28 if it has not.

The image is read by main scanning at step S33 and the raw data representing the image is transmitted to the host computer 20, and returning of the contact sensor 65 to the home position starts at step S73. The device driver 24 subjects the transmitted image data to predetermined processing such as a shading correction at step S34 and stores the processed image data in a file at step S35. Control then returns to step S28.

When it is judged that the communication speed is that of the slow mode ("NO" at step S22), control proceeds to step S41 at which each of the processing circuits of the image reading apparatus 1 is initialized with respect to the slow mode. For example, a setting is made so that the shading correction, gamma correction and scaling are performed by the image processing circuit 79, and a setting is made in such a manner that 8-bit data that is output from the image processing circuit 79 will be output to the data-transmission FIFO 83 incorporated in the USB interface 10. The effective speed of communication between the image reading apparatus 1 and the host computer 20 in the slow mode is measured at step S42.

Next, at step S43, a clock of the timing generator 71 is set based upon the effective speed of communication. The contact sensor 65 is returned to the home position, after which calibration is performed (step S44).

This is followed by step S45, at which the host computer 20 obtains white shading data and black shading data and obtains correction data by calculation.

Next, at step S46, it is determined whether the preview key 35 of the operating window 21 has been pressed. Control proceeds to step S48 if the preview key 35 has been pressed and to step S47 if it has not.

Calibration data corresponding to the resolution of the preview image is obtained and the setting of shading correction data, gamma correction data and scaling factor is performed at step S48. This is followed by step S49, at which the image is read, the read image data is subjected to predetermined image processing such as a correction by the image processing circuit 79 and the processed image data is transmitted to the host computer 20. At step S74, the contact sensor 65 starts to return. The host computer 20 displays the received image data on the preview screen at step S50. Control then returns to step S46.

It is determined at step S47 whether the main scan start button 37 on the operating window 21 has been pressed. Control proceeds to step S51 if the main scan start button 37 has been pressed and returns to step S46 if it has not.

Calibration data corresponding to the resolution of main scanning is obtained and the setting of shading correction data, gamma correction data and scaling factor is performed at step S51. Next, the gear mechanism 60 is changed to a low-speed side at step S75. This is followed by step S52, at which the image is read at a speed based on the resolution, the read image data is subjected to predetermined image processing such as a correction by the image processing circuit 79 and the processed image data is transmitted to the host computer 20. Then at step S76, the gear mechanism 60 is changed to the high-speed side, and returning of the contact sensor 65 to the home position starts at step S77. The host computer 20 stores the received image data in a file at step S53. Control then returns to step S46.

Thus, in accordance with the fourth embodiment as described above, since a high-speed side of a gear mechanism is set as a default mode, the previewing is performed at high speed. More specifically, even when the communication speed is that of the full-speed (slow) mode, the gear mechanism is set to the high-speed side when the previewing is performed. Further, the gear mechanism is also set to the high-speed side when returning a contact sensor to the home position, which realizes efficient returning operation. Furthermore, the gear mechanism is set to the slow-speed side only when reading the image by main scanning in the full-speed mode. Accordingly, an image can be read at high resolution with high precision with low vibration by operating at a low speed.

<Fifth Embodiment>

The arrangement of FIG. 6 may be so adopted that the buffer memory 80 is constructed by an EDO-type DRAM, wherein the buffer memory is employed exclusively as an image-data transmission buffer using a page mode when the communication speed is high, and is employed also for table reference for the purpose of performing the shading and gamma corrections when the communication speed is low. With regard to memory access in the page mode, high-speed access can be made feasible by writing and reading image data to and from contiguous addresses eight bytes at a time, wherein the image data is composed of four pixels per color and is written/read in units of eight bytes, by way of example. This changing over of the DRAM access mode can be achieved easily by previously fabricating a circuit that executes the access modes in the image processing circuit 79 and effecting the changeover by a value set in a register.

In another example, it can be so arranged that a small-capacity memory capable of high-speed access provided in the image processing circuit 79 is used at the time of high-speed communication, and a low-speed high-capacity memory (buffer memory 80) provided externally of the image processing circuit 79 is used at the time of low-speed communication.

In accordance with the fifth embodiment as described above, the memory access method of storage controller is changed over based upon a communication mode decided by communication-mode decision means. As a result, the optimum reading speed can be realized in both the slow mode and fast mode by a simple and inexpensive circuit arrangement.

<Modifications>

In the second and fourth embodiments, the gear mechanism 60 may be changed to the low-speed side when the reading resolution is high and the communication speed is slow.

Further, it is described that the gear mechanism 60 is changed between the high-speed side and the low-speed side, however, the number of choices is not limited to two, and the gear mechanism 60 may be changed among 3 or more choices. Further, the gear mechanism 60 may be changed in accordance with a communication speed, an image read mode (resolution, color/monochrome/binary), crop width, and/or ability of a host computer.

Further, the interface is not limited to those compliant with USB, and an interface compliant with IEEE 1394, for instance, may be used. Moreover, when a plurality of interfaces are provided, the gear mechanism 60 may be changed in accordance with the interface for communication.

Further, the image reading apparatuses described in the first to fourth embodiment have configurations which use contact sensors. However, the present invention is not limited to this, and any known image reading mechanism can be adopted.

<Sixth Embodiment>

Next, the sixth embodiment of the present invention will be described.

Figure 16:
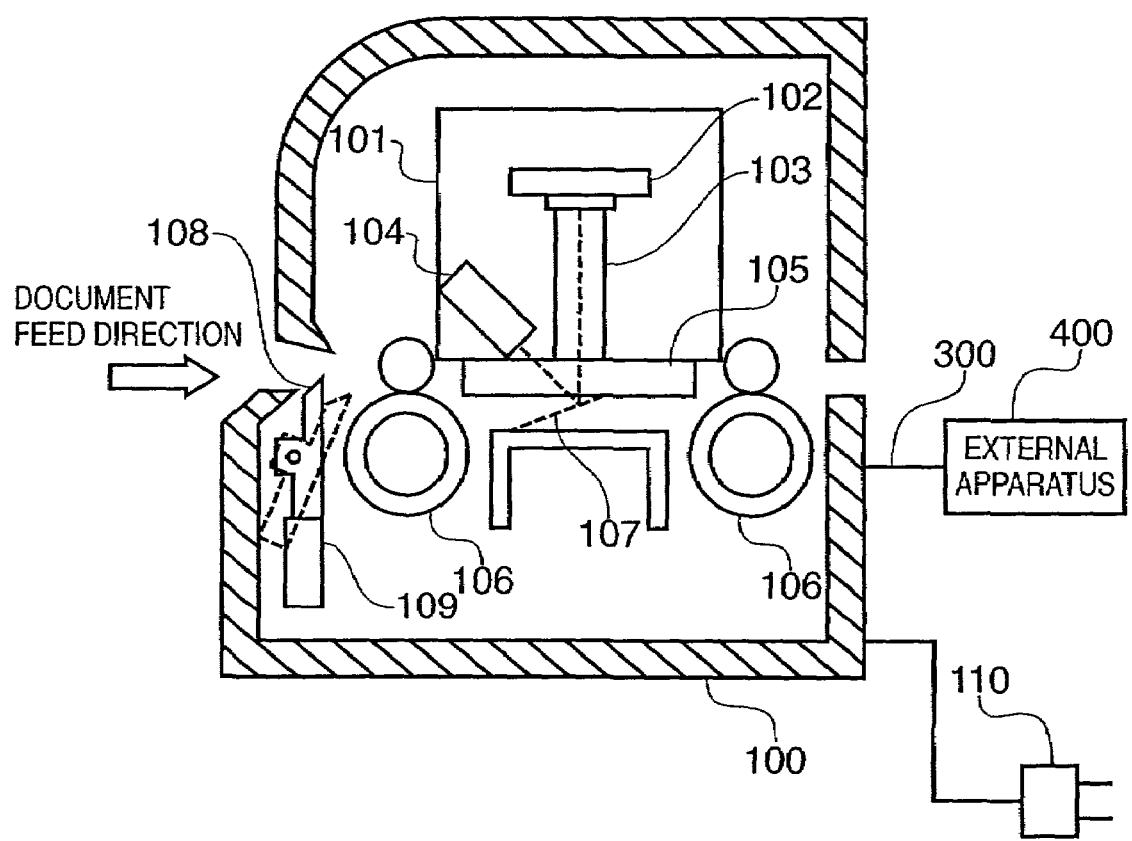
FIG. 16 is a sectional view showing the mechanical arrangement of an image reading apparatus according to a sixth embodiment of the present invention.

FIG. 16 is a sectional view showing the mechanical arrangement of an image reading apparatus according to the sixth embodiment of the present invention. A contact image sensor (CIS) 101 for reading a document image has a photodiode 102, SELFOC lens 103, LED array 104, and contact glass 105. Feed rollers 106 for feeding a document are disposed before and after the CIS 101, and feed a document below the contact glass 105. A contact sheet 107 makes the document contact the lower surface of the contact glass 105. Such system for reading the document image while feeding the document is called a sheet-feed type.

When a document is inserted into a document insert port, a document detect lever 108 tilts, and the output from a document sensor 109 changes in accordance with this tilt. A CPU 215 (to be described later; see FIG. 17) can detect insertion of the document on the basis of the change in output from the document sensor 109. Upon detection of insertion of the document, the CPU 215 controls the CIS 101 to read the document image while driving the document feed rollers 106 by a drive motor (not shown).

This document reading apparatus 100 has a function of obtaining electric power from an external power supply (preferably, a commercial power supply such as an AC power supply or the like) 110 as a power supply other than that of an external apparatus 400 such as a computer or the like, and a function of obtaining electric power from the external apparatus 400 via a connection table (e.g., a USB cable) 300.

Figure 17:
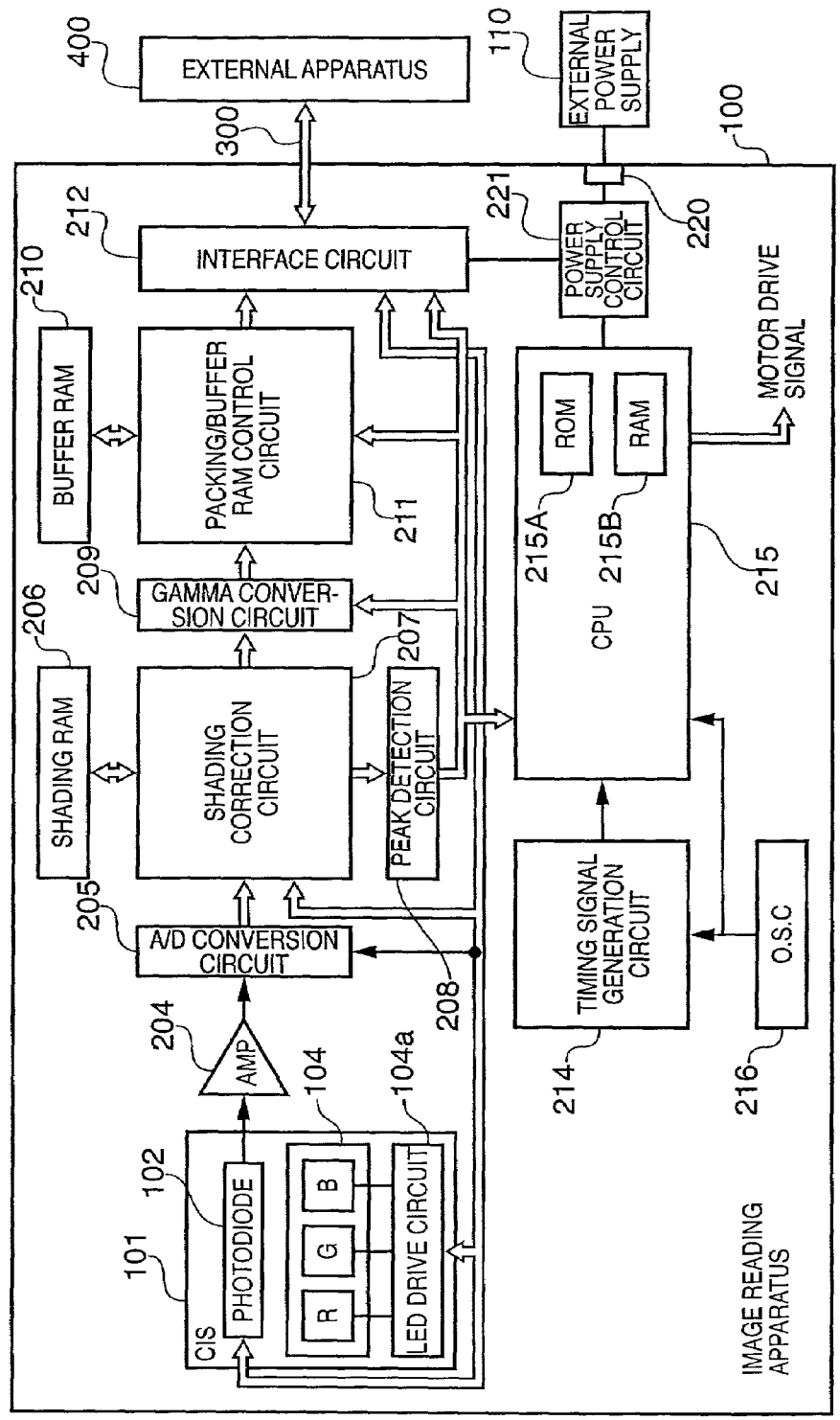
FIG. 17 is a block diagram showing the circuit arrangement of the image reading apparatus according to the sixth embodiment of the present invention.

FIG. 17 is a block diagram showing the circuit arrangement of the image reading apparatus 100 shown in FIG. 16. The CIS 101 has an LED drive circuit 104a for driving (controlling) the LED array 104 in addition to the photodiode 102 and LED array 104 mentioned above. When a document image is read, the LED drive circuit 104a turns on three, R, G, and B LEDs in turn upon reading each line to illuminate a document in accordance with a command from the CPU 215. This illumination light is reflected by the document and enters the photodiode 102, which converts that light into an electrical signal. With this process, R, G, and B line-sequential color read images are obtained.

An AMP (amplifier circuit) 204 amplifies the signals output from the CIS 101, and supplies the amplified signals to an A/D conversion circuit 205. The A/D conversion circuit 205 converts the signals supplied from the AMP 204 into digital data, and supplies the digital data to a shading correction circuit 207.

A shading RAM 206 stores shading correction data obtained by reading a calibration sheet in the same manner as a document. The shading correction circuit 207 performs shading correction of the read image data of the document on the basis of the data stored in the shading RAM 206. A peak detection circuit 208 detects peak values of the read image data in units of lines, and is used to detect the leading end of the document.

A gamma conversion circuit 209 performs gamma conversion of the read image data in accordance with a gamma curve set by, e.g., the external apparatus 400 such as a computer or the like.

A buffer RAM 210 is a RAM (transmission buffer) for temporarily storing image data to be sent to the external apparatus 400. A packing/buffer RAM control circuit 211 executes a process for executing a packing process of the read image data in accordance with an image output mode (e.g., binary, 4-bit multi-valued, 8-bit multi-valued, 24-bit multi-valued, and the like) set in advance by the external apparatus 400 or the like, and writing the processed data in the buffer RAM 210, and a process for reading out the read image data written in the buffer RAM 210 and supplying the readout data to an interface circuit 212.

The interface circuit 212 has a communication function of exchanging control information and image data with the external apparatus 400 such as a computer or the like via the connection table 300, and has a function of receiving electric power supplied from the external apparatus 400. As for the types of interfaces, those compliant with USB 1.1, USB 2.0, and IEEE 1394, for instance, are preferable.

A power supply control circuit 221 supplies electric power, which is supplied from the external apparatus 400 via the connection cable 300, to the internal units (components that require power supply) when the external power supply 110 cannot be used (e.g., when the external power supply 110 is not connected to a plug 220), and supplies electric power to the respective units using the external power supply 110 when it can be used.

The CPU 215 has a ROM 215A that stores a control program, and a RAM 215B serving as a work area, and controls the respective units in accordance with the control program stored in the ROM 215A. The CPU 215 can recognize the type of interface which is currently used by, e.g., referring to status of the interface circuit 212 supply control circuit 221.

A timing signal generation circuit 214 generates various timing signals by frequency-dividing a periodic signal output from a quartz oscillator 216 in accordance with an instruction from the CPU 215. The CPU 215 selects an operation mode in accordance with the interface which is currently used, and controls the timing signal generation circuit 214 in accordance with the operation mode.

Figure 18:
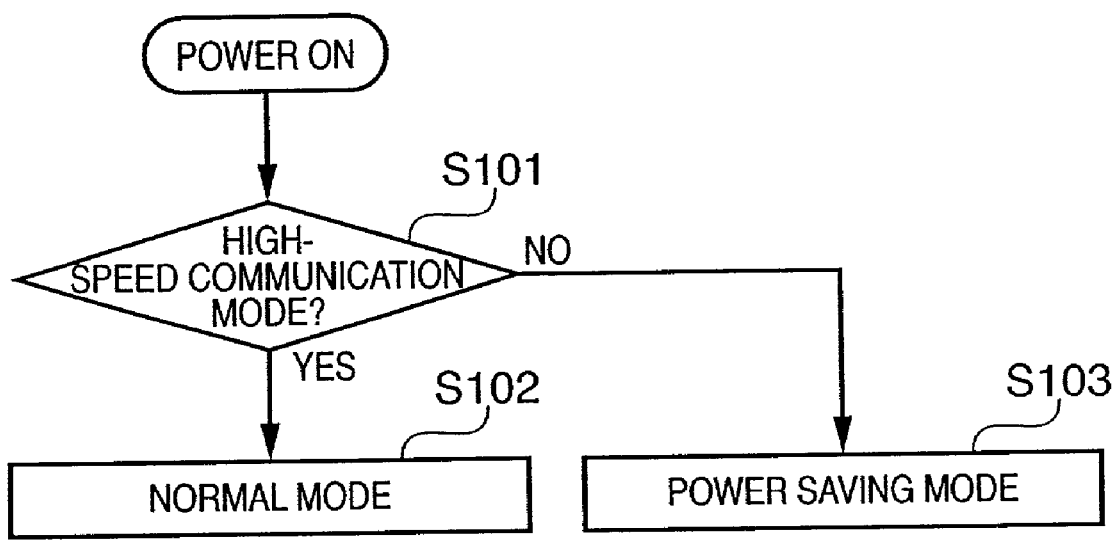
FIG. 18 is a flowchart showing the operation upon setting an operation mode in the image reading apparatus according to the sixth embodiment of the present invention.

FIG. 18 is a flow chart showing the operation of the image reading apparatus according to the sixth embodiment of the present invention shown in FIGS. 16 and 17. Note that this operation is controlled by the CPU 215 on the basis of the control program stored in the ROM 215A. This control program may be externally provided and installed in the image reading apparatus 100. That is, the control program itself also has the industrial applicability. The control program can be distributed while being stored in, e.g., a memory medium, or via a network such as the Internet or the like.

When the power supply is turned on, the CPU 215 refers to status of the interface circuit 212 in step S101 to check if a high-speed communication mode (fast mode) is used. If the high-speed communication mode is used, the flow advances to step S102; if the high-speed communication mode is not used (i.e., if low-speed communication mode (slow mode) is used), the flow advances to step S103.

In step S102, the read mode is forcibly set in a normal mode. In step S103, the read mode is forcibly set in a power saving mode. In the power saving mode, consumption power required in an image read operation or the like is suppressed. In the power saving mode, for example, the CPU 215 controls the respective units to set a low operation speed of movable portions such as the drive motor (not shown) for driving the feed rollers 106 and the like, and to reduce the amount of light (drive power) of the LED array 104 that illuminates a document. The normal mode is a mode other than the power saving mode.

Note that the power saving mode may suppress consumption power in operations other than the image read operation.

In this way, when the low-speed communication mode is selected, since the operation mode such as the read mode or the like is set in the power saving mode, electric power that the image reading apparatus 100 requires can be suppressed.

<Seventh Embodiment>

The image reading apparatus according to the sixth embodiment of the present invention is a sheet-feed type image reading apparatus, but the present invention can also be applied to image reading apparatuses other than the sheet-feed type. An image reading apparatus other than the sheet-feed type will be exemplified below.

Figure 19:
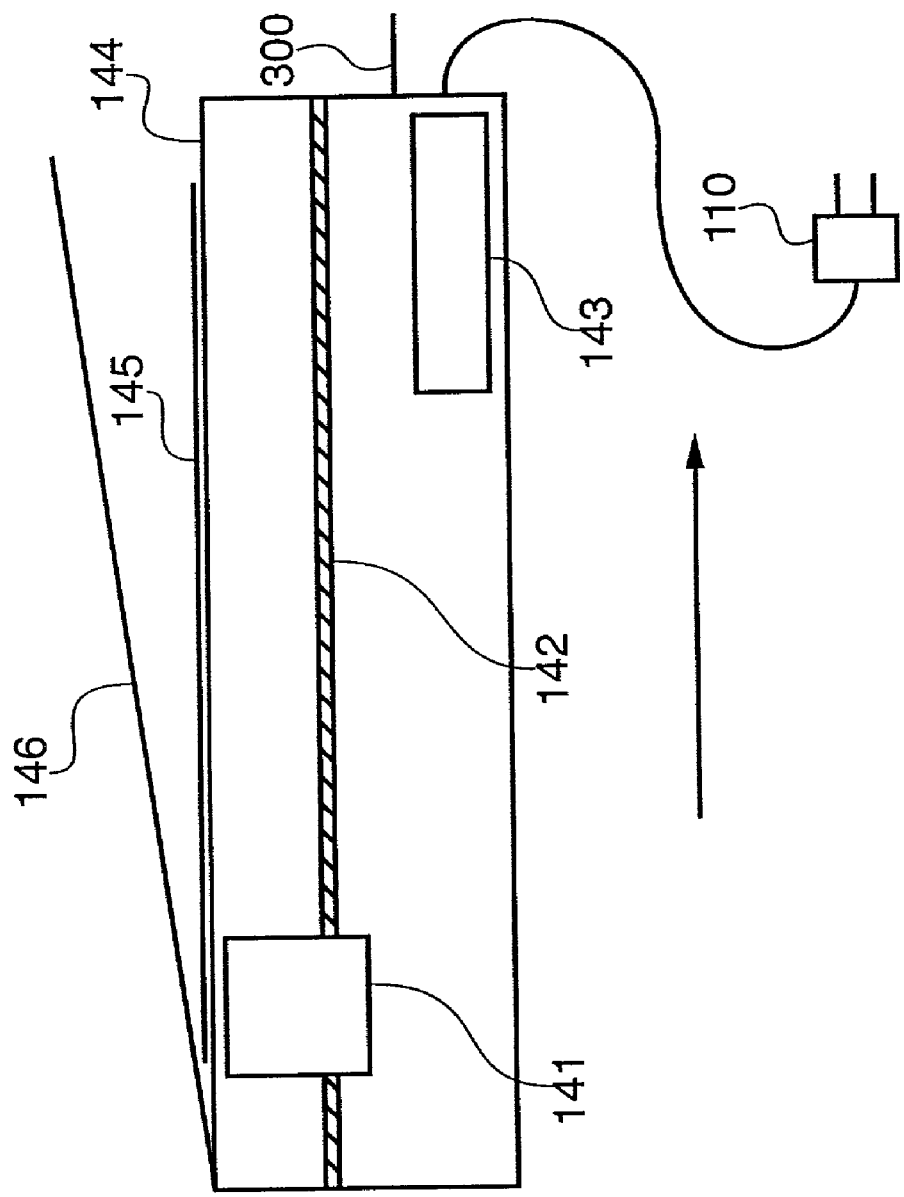
FIG. 19 is a view showing the mechanical arrangement of an image reading apparatus according to a seventh embodiment of the present invention.

FIG. 19 shows a schematic arrangement of a flatbed-type image reading apparatus according to the seventh embodiment of the present invention. This image reading apparatus has a CIS 141, shaft 142, motor 143, platen 144, and pressure plate 146. In this image reading apparatus, a document 145 is placed on the platen 144, and its image is read while the CIS 141 is moved by the motor 143 in the direction of an arrow. Note that the arrangement of the control circuit can adopt that shown in FIG. 17. The operation of this embodiment is the same as that shown in FIG. 18.

<Eighth Embodiment>

Figure 20:
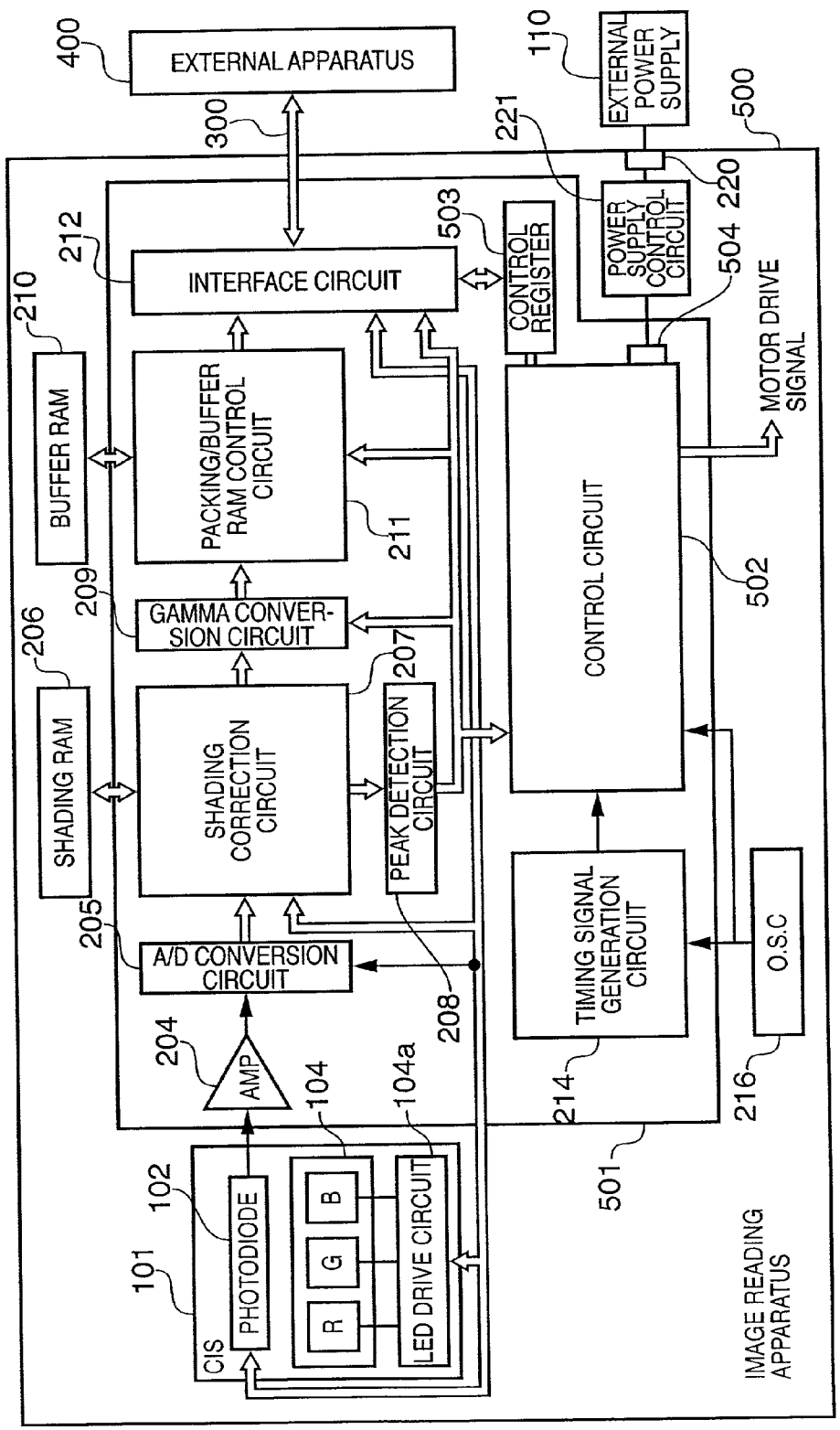
FIG. 20 is a block diagram showing the circuit arrangement of an image reading apparatus according to an eighth embodiment of the present invention.

FIG. 20 shows the circuit arrangement of a flatbed-type image reading apparatus according to the eighth embodiment of the present invention. Note that the same reference numerals in FIG. 20 denote the same building components as those of the image reading apparatus shown in FIG. 17.

A document reading apparatus 500 has a function of obtaining electric power from an external power supply (preferably, a commercial power supply such as an AC power supply or the like) 110, and a function of obtaining electric power from an external apparatus 400 such as a computer or the like via a connection table (e.g., a USB cable) 300, as in the sixth and seventh embodiments.

The image reading apparatus 500 of the eighth embodiment has a control IC 501, in which an AMP 204, A/D conversion circuit 205, shading correction circuit 207, peak detection circuit 208, gamma conversion circuit 209, packing/buffer RAM control circuit 211, interface circuit 212, timing signal generation circuit 214, control circuit 502, and control register 503 are integrated.

The control IC 501 passes a command to the control circuit 502 by turning on/off corresponding ones of a plurality of control bits of the control register 503 in accordance with a command supplied from the external apparatus 400 via the connection cable 300. The control circuit 502 executes a process in correspondence with the states of the control bits of the control register 503. The external apparatus 400 can confirm the status of the image reading apparatus 500 by reading out the status bits of the control register 503 via the connection cable 300 and interface circuit 212. The control IC 501 has an input port 504 connected to the power supply control circuit 221, and can confirm the status of the power supply control circuit 221 on the basis of a value input to the input port 504. More specifically, the control IC 501 can recognize the device connected to the interface circuit 212, assign addresses and decide the communication speed by performing enumeration when power is introduced. Information indicating the decided communication speed is also written in the status bits of the control register 503 by the control circuit 502, and the external apparatus 400 can recognize the communication speed by reading out the status bits via the connection cable 300 and interface circuit 212.

FIGS. 21 to 24 are flowcharts showing the operation of the image reading apparatus shown in FIG. 20. FIG. 25 shows a schematic arrangement of the image reading apparatus 500 shown in FIG. 20.

Figure 21:
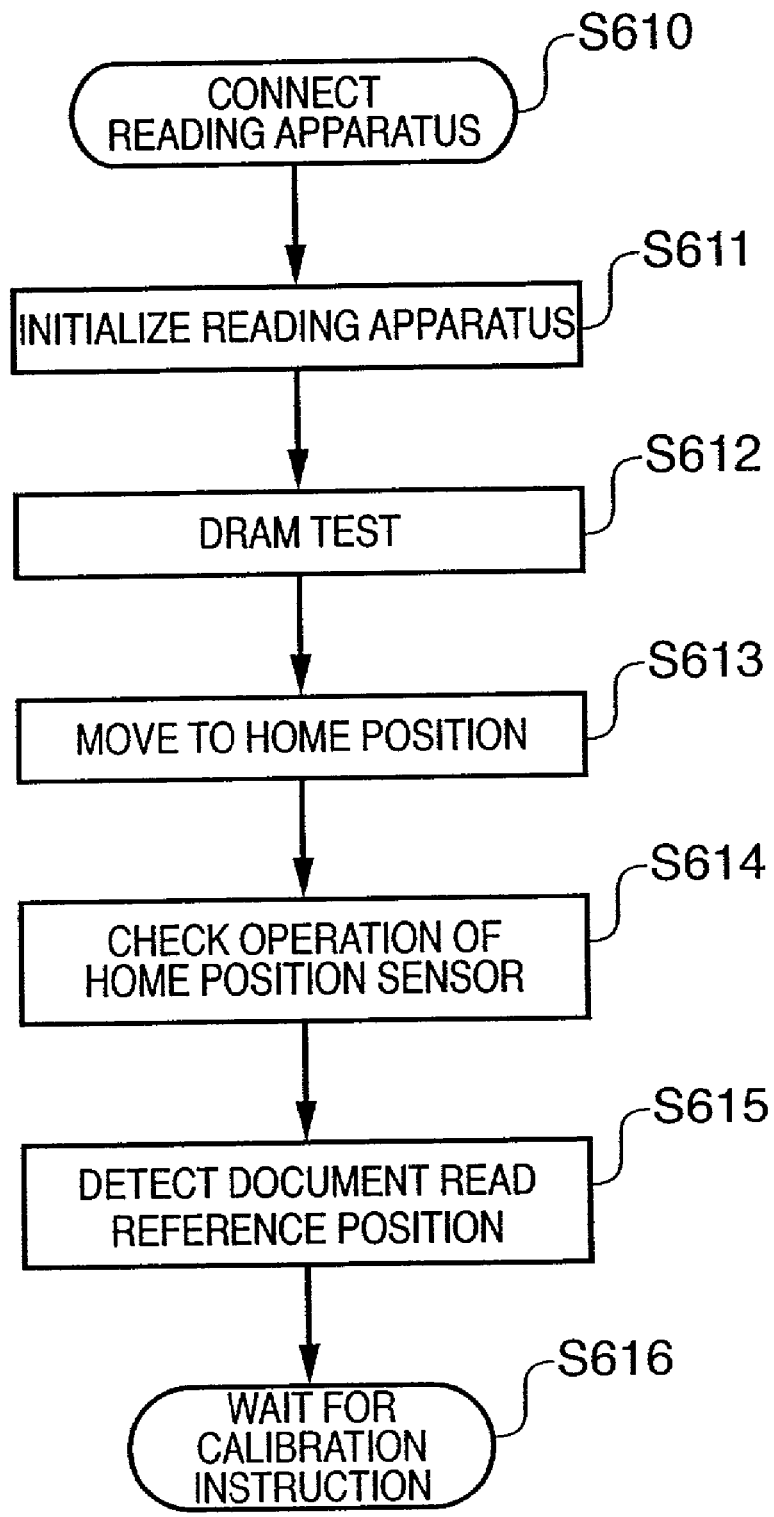
FIG. 21 is a flowchart showing the operation of the image reading apparatus according to the eighth embodiment of the present invention.

When the connection cable 300 such as a USB cable or the like is connected to the connector of the interface circuit 212, and the external apparatus 400 such as a computer or the like confirms it, the external apparatus 400 controls execution of processes shown in FIG. 21 in the image reading apparatus 500 (step S610).

In step S611, the external apparatus 400 confirms if it can normally communicate with the image reading apparatus 500 and, after that, a default value is written in the control bits of the control register 503, thereby the image reading apparatus 500 is initialized. In step S612, the control IC 501 of the image reading apparatus 500 conducts read/write tests of the buffer RAM 210 and shading RAM 206 in accordance with a command from the external apparatus 400.

In step S613, the control circuit 502 moves the CIS 141 to the home position, as shown in FIG. 25, in accordance with a command from the external apparatus 400. The home position is set outside the image read range, as shown in FIG. 25, and when a projection 148 provided to the CIS 141 intercepts a photointerrupter 147, it is detected that the CIS 141 is located at the home position. In step S614, the control circuit 502 moves the CIS 141 forward to fall outside the home position (to the right in FIG. 25) in accordance with a command from the external apparatus 400 so as to confirm if a home position sensor (not shown) works correctly. After that, the control circuit 502 moves the CIS 141 backward to the home position.

In this image reading apparatus 500, a reference plate 150 is set to contact the end portion of a platen glass 152. The reference plate 150 is formed by arranging white and black regions, each of which extends over the full main scan range, in the sub-scan direction. The boundary between the white and black regions corresponds to a document read reference position. The CIS 141 is located at a position corresponding to the black region when it is at its home position. In step S615, the control circuit 502 makes light adjustment of LEDs of the CIS 141 so as not to disturb the read operation of the CIS 141 of the document read reference position, moves the CIS 141 forward, detects the document read reference position as the number of steps of the motor 143, and stores it in accordance with a command from the external apparatus 400. The control circuit 502 turns off the LESs of the CIS 141, returns the CIS 141 to the home position, and ends the detection process of the document read reference position.

Figure 22:
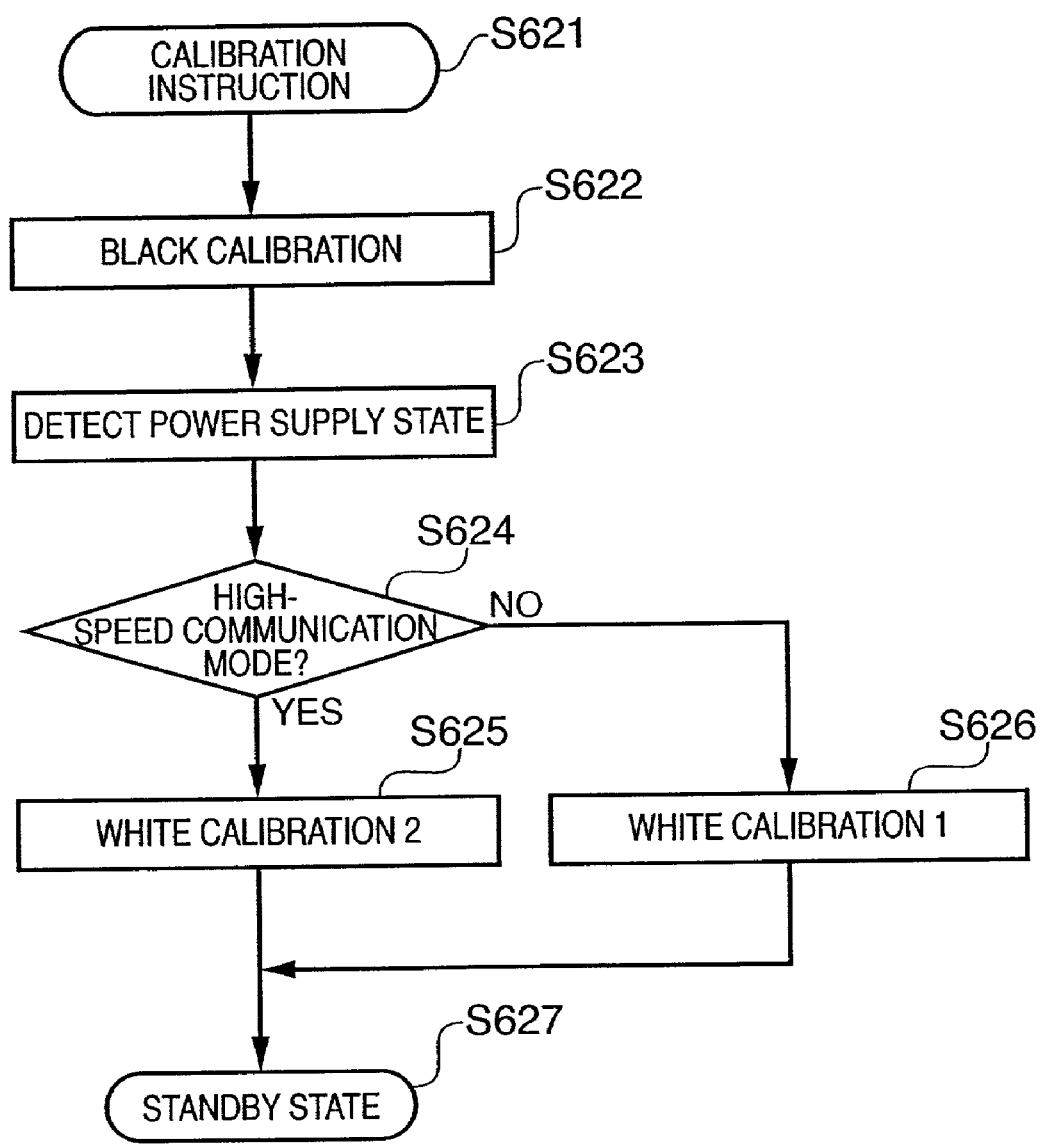
FIG. 22 is a flowchart showing the operation of the image reading apparatus according to the eighth embodiment of the present invention.

After the processes shown in FIG. 21, a calibration process shown in FIG. 22 is executed in accordance with a calibration instruction from the external apparatus 400 (step S621). In step S622, the control circuit 502 reads the output from the CIS 141 for a plurality of lines while the CIS 141 is located at the home position (a position corresponding to the black region) and the LEDs of the CIS 141 are kept OFF, in accordance with a command from the external apparatus 400. The average value of the read outputs is then stored as black calibration data in the shading RAM 206.

In step S624, the control circuit 502 performs enumeration to decide the communication speed of the interface circuit 212. As a result, if the communication speed is that of a fast mode, then the flow advanced to step S625, whereas, if the communication speed is not that of a fast mode (i.e., a slow mode), the flow advances to step S626.

In step S625, the control circuit 502 turns on the LEDs of the CIS 141 with "light amount 2" for the normal mode, moves the CIS 141 to the white region of the reference plate 150, and reads the output from the CIS 141 for a plurality of lines. The control circuit 502 generates "white calibration data 2" on the basis of high-output data of the read data for the plurality of lines, and stores it in the shading RAM 206.

In step S626, the control circuit 502 turns on the LEDs of the CIS 141 with "light amount 1" for the power saving mode, generates "white calibration data 1" by the same method upon generating "white calibration data 2", and stores it in the shading RAM 206.

After generation of "white calibration data 1" or "white calibration data 2", the image reading apparatus 500 shifts to a standby state (step S627). In the standby state, the external apparatus 400 monitors the status bits of the control register 503 constantly or periodically. The calibration data is used in shading correction.

Figure 23:
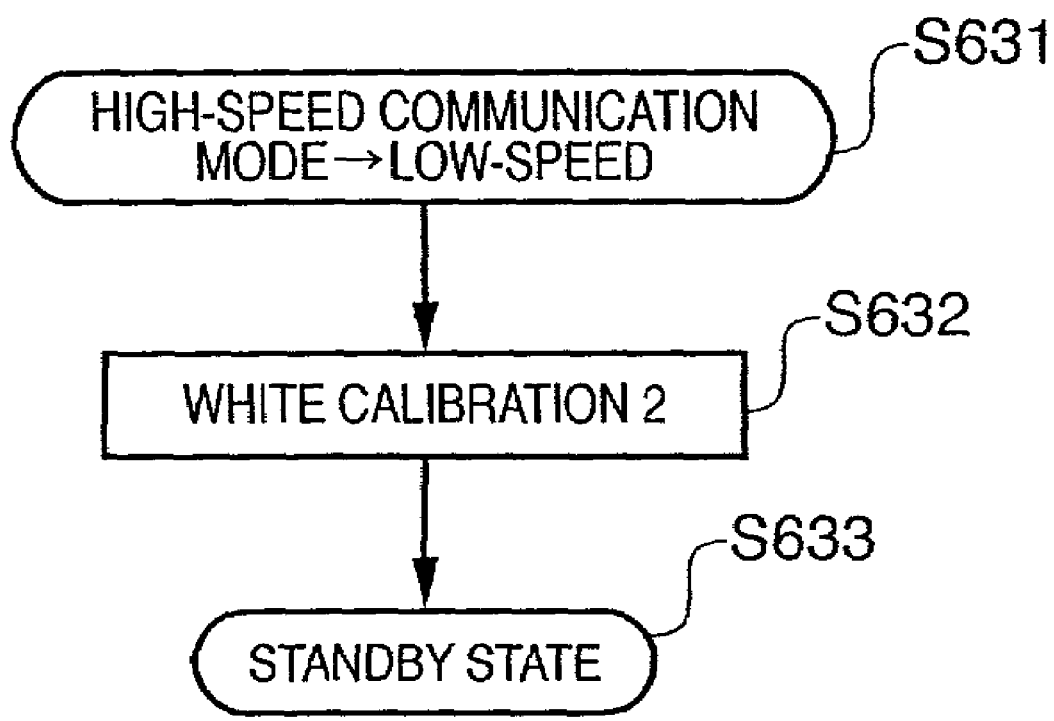
FIG. 23 is a flowchart showing the operation of the image reading apparatus according to the eighth embodiment of the present invention.

In the standby state, when the status shifts from the slow mode to the fast mode, the process shown in FIG. 23 is executed (step S631). The status shift from the fast mode to the slow mode is detected by, e.g., monitoring the kinds of devices connected to the interface circuit 212. In step S632, the control circuit 502 turns on the LEDs of the CIS 141 with "light amount 2" for the normal mode, moves the CIS 141 to the white region of the reference plate 150, and reads the output from the CIS 141 for a plurality of lines as in step S625. The control circuit 502 generates "white calibration data 2" on the basis of high-output data of the read data for the plurality of lines, and stores it in the shading RAM 206. In this manner, "white calibration data 2" required for reading an image in the normal mode is prepared. After that, the image reading apparatus shifts to the standby state again.

Figure 24:
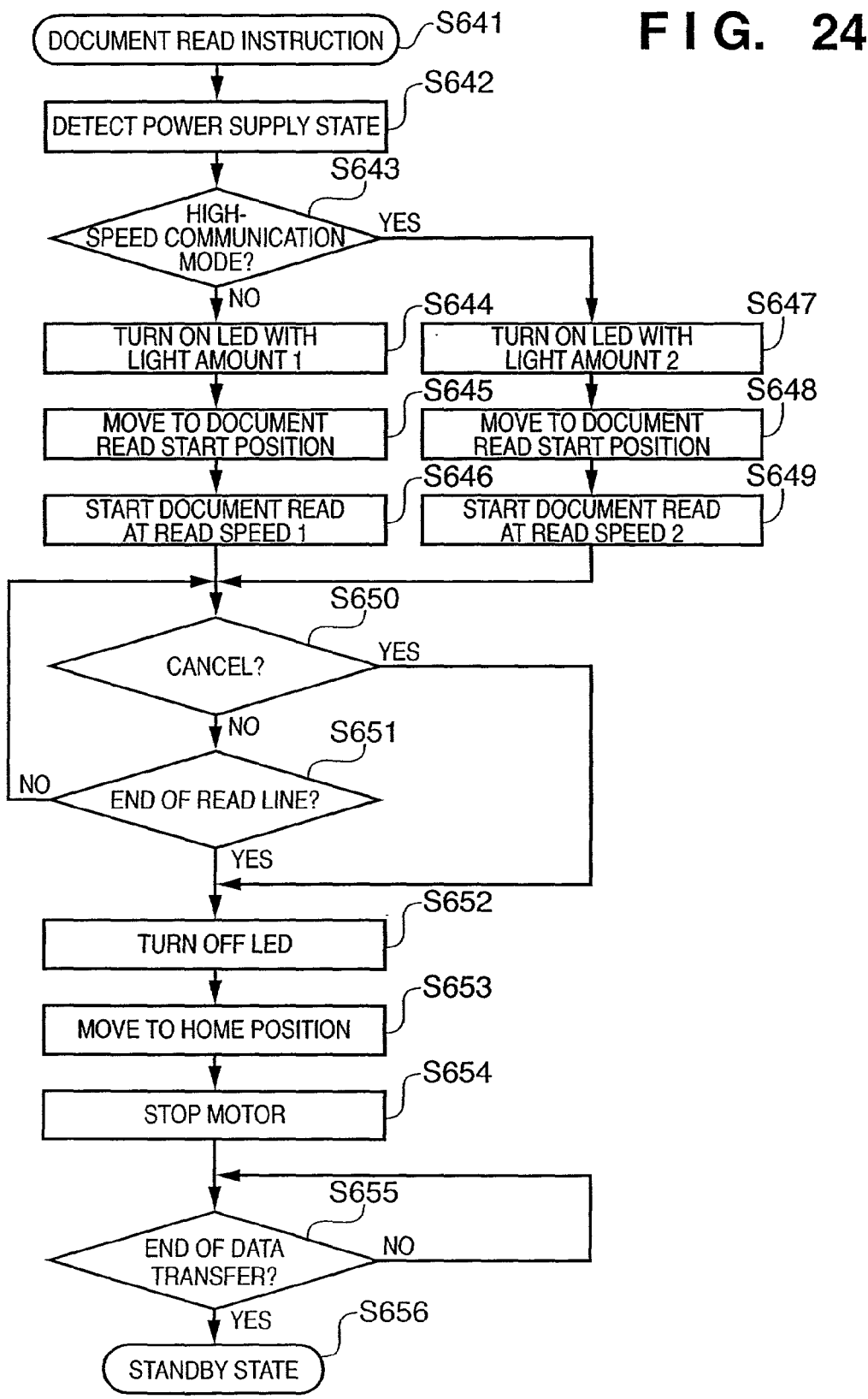
FIG. 24 is a flowchart showing the operation of the image reading apparatus according to the eighth embodiment of the present invention.

Upon receiving a read instruction from the external apparatus 400 in the standby state, the process shown in FIG. 24 is executed (step S641). In step S642, the control circuit 502 decides the communication speed by obtaining information relating communication mode of a communication channel. If the communication speed is that of the fast mode, the flow advances to step S647; if the communication speed is not that of the fast mode (i.e., that of the slow mode), the flow advances to step S644. Advancing to step S644 means that an image is read in the power saving mode, and advancing to step S647 means that an image is read in the normal mode.

In the power saving mode, the control circuit 502 turns on the LEDs of the CIS 141 with "light amount 1" for the power saving mode in step S644, moves the CIS 141 to a document read start reference position in step S645, and starts document read at "read speed 1" for the power saving mode in step S646. In this case, the shading correction circuit 207 executes shading correction of A/D-converted read image data using "black calibration data" and "white calibration data 1" stored in the shading RAM 206.

On the other hand, in the normal mode, the control circuit 502 turns on the LEDs of the CIS 141 with "light amount 2" for the normal mode in step S647, moves the CIS 141 to a document read start reference position in step S648, and starts document read at "read speed 2" for the normal mode in step S649. In this case, the shading correction circuit 207 executes shading correction of A/D-converted read image data using "black calibration data" and "white calibration data 2" stored in the shading RAM 206. Note that (light amount 1)<(light amount 2), and (read speed 1)<(read speed 2).

Upon receiving a read cancel instruction from the external apparatus 400 or the like during the document read operation, the control circuit 502 cancels read in step S650. If no cancel instruction is input, the document is read to its last line (YES in step S651).

Upon completion of read, the control circuit 502 turns off the LEDs of the CIS 141 in step S652, returns the CIS 141 to the home position in step S653, and stops the motor 143 for driving the CIS 141 in step S654. The read image data undergoes a process designated by the external apparatus 400, and is temporarily saved in the buffer RAM 210. The control circuit 502 transfers the image data temporarily saved in the buffer RAM 210 to the external apparatus 400 via the connection cable 300 in step S655.

The present invention can also be applied to an image reading apparatus in which a document and photoelectric conversion elements are fixed in position, and an illumination device and mirror are scanned. When such an image reading apparatus is used, electric power for driving a scanning unit (e.g., illumination device, mirror, and the like) for optically scanning a document is set to be relatively small to lower a scanning speed in the slow mode; in the fast mode, electric power for driving the scanning unit is set to be relatively large to higher the scanning speed.

According to the eighth embodiment as described above, energy consumption is properly controlled in accordance with an interface which is used.

It should be noted that the present invention includes combinations of the aforesaid embodiments or technical elements disclosed therein.

<Other Embodiment>

The present invention can be applied to a system constituted by a plurality of devices (e.g., host computer, interface, scanner, video camera) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in FIGS. 7 and 8, or FIGS. 10 and 11, or FIGS. 14 and 15, or FIG. 18, or FIGS. 21 to 24, or combinations thereof.

The present invention is not limited to the above embodiments and various changes and modifications can be made within the spirit and scope of the present invention. Therefore to apprise the public of the scope of the present invention, the following claims are made.

What is claimed is:

1. An image sensing apparatus capable of connecting to an external information processing apparatus, comprising:
    an image sensor adapted to sense an object and output an image signal representing the image of the object;
    a signal processor adapted to subject the image signal to predetermined signal processing;
    a communication unit adapted to communicate with said information processing apparatus; and
    a controller adapted to change over a control method of said signal processor in accordance with the communication speed of said communication unit.

2. The apparatus according to claim 1, wherein said communication unit is capable of performing communication at a plurality of communication speeds and said controller performs control in such a manner that the image signal is transmitted without being subjected to signal processing by said signal processor if the communication speed of said communication unit is high, and such that the image signal is transmitted after being subjected to signal processing by said signal processor if the communication speed of said communication unit is low.

3. The apparatus according to claim 2, wherein said controller performs control so as to transmit the image signal, which has bypassed said signal processor, if the communication speed is high.

4. The apparatus according to claim 2, further comprising memory adapted to store the image signal temporarily,
    wherein said controller changes over a method of accessing said memory in accordance with communication speed of said communication unit.

5. The apparatus according to claim 4, wherein said memory includes first memory having a high access speed and second memory having a low access speed, said communication unit is capable of performing communication at a plurality of communication speeds and said controller performs control in such a manner that only said first memory is used to output the image signal to said communication unit when the communication speed of said communication unit is high, and said second memory is used to output the image signal to said communication unit when the communication speed of said communication unit is low.

6. The apparatus according to claim 1, wherein said controller changes the driving speed of said image sensor in accordance with the communication speed of said communication unit.

7. The apparatus according to claim 6, further comprising a movement controller adapted to move said image sensor in a sub-scan direction,
    wherein said controller changes a moving speed of said image sensor controlled by said movement controller in accordance with the communication speed of said communication unit.

8. The apparatus according to claim 7, wherein said communication unit is capable of performing communication at a plurality of communication speeds and said controller controls the moving speed of said movement controller to be a first speed if the communication speed of said communication unit is high, and to be a second speed which is slower than the first speed if the communication speed of said communication unit is low.

9. The apparatus according to claim 7, wherein said communication unit is capable of performing communication at a plurality of communication speeds and said controller controls the moving speed of said movement controller to be a first speed if the communication speed of said communication unit is high, and to be a second speed which is slower than the first speed if the communication speed of said communication unit is low and a required resolution is high.

10. The apparatus according to claim 8, wherein said controller controls the moving speed of said image sensor controlled by said movement controller to be the first speed which executing pre-image sensing operation regardless of the communication speed of said communication unit.

11. The apparatus according to claim 8, wherein said controller controls the moving speed of said image sensor controlled by said movement controller to be the first speed while said image sensor is moving to the home position regardless of the communication speed of said communication unit.

12. The apparatus according to claim 1, further comprising a power controller adapted to change over an electric power supply mode in accordance with communication speed of said communication unit.

13. The apparatus according to claim 12, wherein said communication unit is capable of performing communication at a plurality of communication speeds and said power controller selects a power saving mode as the electric power supply mode if the communication speed of said communication unit is low.

14. The apparatus according to claim 13, wherein said image sensor comprises an illumination unit adapted to illuminate the object upon sensing the object, and in the power saving mode, electric power for driving said illumination unit is reduced compared to other mode.

15. The apparatus according to claim 14, wherein said image sensor comprises an illumination unit adapted to illuminate the object upon sensing the object and photoelectric conversion elements, and in the power saving mode, electric power for driving said illumination unit is reduced and an image sensing period by said photoelectric conversion elements are prolonged compared to other mode.

16. The apparatus according to claim 1, further comprising a switch adapted to enable manually switching communication speeds of said communication unit.

17. An information processing apparatus capable of controlling an external image sensing apparatus by connecting thereto, said external image sensing apparatus having an image sensor adapted to sense an object and output an image signal representing the image of the object, a signal processor adapted to subject the image signal to predetermined signal processing, and a communication unit adapted to perform communication, said information processing apparatus comprising:

a communication unit adapted to communicate with the external image sensing apparatus;

a sensor adapted to sense communication speed of said communication unit;

a signal processor adapted to subject the image signal, which has been obtained from the image sensing apparatus, to predetermined signal processing; and a controller adapted to perform control so as to change over a method of controlling the signal processor of said external image sensing apparatus in accordance with the communication speed sensed by said sensor, and change over control of the signal processor within said information processing apparatus.

18. The apparatus according to claim 17, wherein said communication unit of said external image sensing apparatus is capable of performing communication at a plurality of communication speeds, and if the communication speed of said communication unit is high, said controller performs control in such a manner that the image signal is transmitted without being subjected to signal processing by the signal processor of said external image sensing apparatus, and performs control in such a manner that signal processing by the signal processor within said information processing apparatus is executed, and if the communication speed of said communication unit is low, said controller performs control in such a manner that the image signal is transmitted after being subjected to signal processing by the signal processor of said external image sensing apparatus, and performs control in such a manner that signal processing by the signal processor within said information processing apparatus is not executed.

19. The apparatus according to claim 18, wherein said controller performs control so as to transmit the image signal, which has bypassed said signal processor, if the communication speed is high.

20. The apparatus according to claim 18, wherein said external image sensing apparatus further comprising memory adapted to store the image signal temporarily, wherein said controller changes over a method of accessing said memory in accordance with communication speed sensed by said sensor.

21. The apparatus according to claim 20, wherein said memory includes first memory having a high access speed and second memory having a low access speed, said external image sensing apparatus is capable of performing communication at a plurality of communication speeds and said controller performs control in such a manner that only said first memory is used to output the image signal to said communication unit when the communication speed of said communication unit is high, and said second memory is used to output the image signal to said communication unit when the communication speed of said communication unit is low.

22. The apparatus according to claim 17, wherein said controller changes the driving speed of said image sensor in accordance with the communication speed sensed by said sensor.

23. The apparatus according to claim 22, wherein the external image sensing apparatus further comprising a movement controller adapted to move the image sensor in a sub-scan direction, wherein said controller changes a moving speed of said image sensor controlled by said movement controller in accordance with the communication speed of said communication unit.

24. The apparatus according to claim 17, wherein said communication unit of said external image sensing apparatus is capable of performing communication at a plurality of communication speeds, and said controller controls the moving speed of said movement controller to be a first speed if the communication speed of said communication unit is high, and to be a second speed which is slower than the first speed if the communication speed of said communication unit is low.

25. The apparatus according to claim 23, wherein said communication unit of said external image sensing apparatus is capable of performing communication at a plurality of communication speeds and said controller controls the moving speed of said movement controller to be a first speed if the communication speed of said communication unit is high, and to be a second speed which is slower than the first speed if the communication speed of said communication unit is low and a required resolution is high.

26. The apparatus according to claim 24, wherein said controller controls the moving speed of said image sensor controlled by said movement controller to be the first speed which executing pre-image sensing operation regardless of the communication speed of said communication unit.

27. The apparatus according to claim 24, wherein said controller controls the moving speed of said image sensor controlled by said movement controller to be the first speed while said image sensor is moving to the home position regardless of the communication speed of said communication unit.

28. The apparatus according to claim 17, further comprising a mode switch adapted to change over an electric power supply mode, wherein said controller controls the power controller to change over the power supply mode in accordance with communication speed of said communication unit.

29. The apparatus according to claim 28, wherein said communication unit of said external image sensing apparatus is capable of performing communication at a plurality of communication speeds and said controller selects a power saving mode as the electric power supply mode if the communication speed of said communication unit is low.

30. The apparatus according to claim 29, wherein said image sensor of said external image sensing apparatus comprises an illumination unit adapted to illuminate the object upon sensing the object, and in the power saving mode, electric power for driving said illumination unit is reduced compared to other mode.

31. The apparatus according to claim 30, wherein said image sensor of said external image sensing apparatus comprises an illumination unit adapted to illuminate the object upon sensing the object and photoelectric conversion elements, and in the power saving mode, electric power for driving said illumination unit is reduced and an image sensing period by said photoelectric conversion elements are prolonged compared to other mode.

32. A method of controlling an image sensing apparatus having an image sensor adapted to sense an object and output an image signal representing the image of the object, a signal processor adapted to subject the image signal to predetermined signal processing, and a communication unit adapted to perform communication, said method comprising;

a sensing step of sensing communication speed of the communication unit; and a control step of performing control so as to change over a method of controlling the signal processor in accordance with the communication speed sensed at said sensing step.

33. The method according to claim 32, wherein said communication unit is capable of performing communication at a plurality of communication speeds and said control step performs control in such a manner that the image signal is transmitted without being subjected to signal processing by said signal processor if the communication speed of said communication unit is high, and such that the image signal is transmitted after being subjected to signal processing by said signal processor if the communication speed of said communication unit is low.

34. The method according to claim 33, wherein said control step transmits the image signal, which has bypassed said signal processor, if the communication speed is high.

35. The method according to claim 33, further comprising memory adapted to store the image signal temporarily, wherein said control step changes over a method of accessing said memory in accordance with communication speed of said communication unit.

36. The method according to claim 35, wherein said memory includes first memory having a high access speed and second memory having a low access speed, said communication unit is capable of performing communication at a plurality of communication speeds and said control step performs control in such a manner that only said first memory is used to output the image signal to said communication unit when the communication speed of said communication unit is high, and said second memory is used to output the image signal to said communication unit when the communication speed of said communication unit is low.

37. The method according to claim 32, wherein said control step changes the driving speed of the image sensor in accordance with the communication speed of the communication unit.

38. The method according to claim 37, wherein the external image sensing apparatus further comprising a movement controller adapted to move the image sensor in a sub-scan direction, the method further comprising a moving speed changing step of changing a moving speed of said image sensor controlled by said movement controller in accordance with the communication speed of the communication unit.

39. The method according to claim 38, wherein said communication unit is capable of performing communication at a plurality of communication speeds and said moving speed changing step controls the moving speed of said image sensor controlled by said movement controller to be a first speed if the communication speed of the communication unit is high, and to be a second speed which is slower than the first speed if the communication speed of the communication unit is low.

40. The method according to claim 38, wherein said communication unit is capable of performing communication at a plurality of communication speeds and said moving speed changing step controls the moving speed of said movement controller to be a first speed if the communication speed of said communication unit is high, and to be a second speed which is slower than the first speed if the communication speed of said communication unit is low and a required resolution is high.

41. The method according to claim 39, wherein said moving speed changing step controls the moving speed of said moveent controller to be the first speed while executing pre-image sensing operation regardless of the communication speed of the communication unit.

42. The method according to claim 39, wherein said moving speed changing step controls the moving speed of said image sensor controlled by said movement controller to be the first speed while the image sensor is moving to the home position regardless of the communication speed of said communication unit.

43. The method according to claim 32, wherein the external image sensing apparatus further comprising a mode switch adapted to change over an electric power supply mode, wherein said control step change over the electric power supply mode in accordance with the communication speed sensed at said sensing step.

44. The method according to claim 43, wherein said communication unit is capable of performing communication at a plurality of communication speeds and said control step controls so as to select a power saving mode as the electric power supply mode if the communication speed of the communication unit is low.

45. The method according to claim 44, wherein the image sensor comprises an illumination unit adapted to illuminate the object upon sensing the object, and in the power saving mode, said control step controls to reduce electric power for driving the illumination unit compared to other mode.

46. The method according to claim 45, wherein said image sensor comprises an illumination unit adapted to illuminate the object upon sensing the object and photoelectric conversion elements, and in the power saving mode, said control step controls to reduce electric power for driving the illumination unit and to prolong an image sensing period by the photoelectric conversion elements compared to other mode.

47. A computer program product comprising a computer usable medium having computer readable program code means embodied in said medium for controlling an image sensing apparatus having an image sensor adapted to sense an object and output an image signal representing the image of the object, a signal processor adapted to subject the image signal to predetermined signal processing, and a communication unit adapted to perform communication, said product including:

first computer readable program code means for sensing communication speed of the communication unit; and second computer readable program code means for performing control so as to change over a method of controlling the signal processor in accordance with the sensed communication speed.

* * * * *

UNITED STATES PATENT AND TRADEMARK OFFICE
CERTIFICATE OF CORRECTION

| | |
|---|---|
| PATENT NO. | : 7,006,260 B2 |
| APPLICATION NO. | : 09/993017 |
| DATED | : February 28, 2006 |
| INVENTOR(S) | : Sato et al. |

It is certified that error appears in the above-identified patent and that said Letters Patent is hereby corrected as shown below:

On Title Page, at item (56), References Cited, insert:

--FOREIGN PATENT DOCUMENTS

| | | |
|---|---|---|
| JP | 5-252730 | 9/1993 |
| JP | 5-300333 | 11/1993 |
| JP | 2000-013574 | 1/2000-- |

Signed and Sealed this

Twenty-ninth Day of August, 2006

JON W. DUDAS
*Director of the United States Patent and Trademark Office*